(12) United States Patent
Morikuni

(10) Patent No.: US 11,586,104 B2
(45) Date of Patent: Feb. 21, 2023

(54) PROJECTION SYSTEM AND PROJECTOR

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 70 days.

(21) Appl. No.: 17/155,945

(22) Filed: Jan. 22, 2021

(65) Prior Publication Data
US 2021/0232036 A1 Jul. 29, 2021

(30) Foreign Application Priority Data

Jan. 23, 2020 (JP) .............................. JP2020-008956

(51) Int. Cl.
| | | |
|---|---|---|
| G03B 21/28 | (2006.01) | |
| G02B 5/10 | (2006.01) | |
| G02B 13/16 | (2006.01) | |
| G02B 17/08 | (2006.01) | |
| G02B 13/18 | (2006.01) | |

(52) U.S. Cl.
CPC .............. *G03B 21/28* (2013.01); *G02B 5/10* (2013.01); *G02B 13/16* (2013.01); *G02B 13/18* (2013.01); *G02B 17/08* (2013.01)

(58) Field of Classification Search
CPC ...... G03B 21/20; G03B 21/142; G03B 21/28; G03B 21/2066; G02B 17/0816; G02B 13/002; G02B 13/0065; G02B 13/16; G02B 13/18
See application file for complete search history.

(56) References Cited

U.S. PATENT DOCUMENTS

| | | |
|---|---|---|
| 7,048,388 B2 | 5/2006 | Takaura et al. |
| 7,549,755 B2 | 6/2009 | Suzuki |
| 2004/0156117 A1 | 8/2004 | Takaura et al. |
| 2006/0193036 A1 | 8/2006 | Suzuki |
| 2010/0053737 A1 | 3/2010 | Fujita et al. |
| 2015/0160441 A1 | 6/2015 | Lin |
| 2015/0293434 A1 | 10/2015 | Matsuo |

(Continued)

FOREIGN PATENT DOCUMENTS

| | | |
|---|---|---|
| JP | 2004-246042 A | 9/2004 |
| JP | 2006-235516 A | 9/2006 |

(Continued)

*Primary Examiner* — Magda Cruz
(74) *Attorney, Agent, or Firm* — Oliff PLC

(57) ABSTRACT

A projection system includes a first optical system including a plurality of lenses and a deflector, and a second optical system including an optical element having a concave reflection surface and disposed at the enlargement side of the first optical system. The deflector is disposed in one air gap of a plurality of air gaps provided between the lenses adjacent to each other in the first optical system, the air gap having the largest axial inter-surface distance in the first optical system. The first optical system includes a first section located at the reduction side of the deflector and a second section located at the enlargement side of the deflector. A first optical axis section of the first section and a second optical axis section of the second section intersect each other. The second section includes three or more lenses. The second section is shorter than the first section.

28 Claims, 16 Drawing Sheets

(56) References Cited

U.S. PATENT DOCUMENTS

| | | | |
|---|---|---|---|
| 2016/0112685 A1* | 4/2016 | Matsuo | G02B 17/08 |
| | | | 359/684 |
| 2016/0274344 A1 | 9/2016 | Lin | |
| 2017/0363944 A1* | 12/2017 | Matsuo | G02B 13/16 |
| 2018/0246302 A1* | 8/2018 | Minefuji | G02B 17/08 |
| 2019/0011684 A1 | 1/2019 | Ishihara et al. | |
| 2019/0285972 A1* | 9/2019 | Minefuji | G02B 17/0852 |
| 2020/0033574 A1* | 1/2020 | Morikuni | G02B 13/16 |
| 2020/0033715 A1* | 1/2020 | Morikuni | G02B 17/086 |
| 2020/0278595 A1* | 9/2020 | Yanagisawa | G02B 13/16 |

FOREIGN PATENT DOCUMENTS

| | | |
|---|---|---|
| JP | 2007-316674 A | 12/2007 |
| JP | 2010-020344 A | 1/2010 |
| JP | 2010-085973 A | 4/2010 |
| JP | 2015-108797 A | 6/2015 |
| JP | 2017-156712 A | 9/2017 |
| JP | 2017-156713 A | 9/2017 |
| JP | 2017-156714 A | 9/2017 |
| JP | 2019-133061 A | 8/2019 |
| JP | 2019-164184 A | 9/2019 |
| JP | 2020-024377 A | 2/2020 |
| JP | 2020-042103 A | 3/2020 |
| JP | 2020-194115 A | 12/2020 |
| WO | 2014/103324 A1 | 7/2014 |

* cited by examiner

PROJECTION SYSTEM AND PROJECTOR

The present application is based on, and claims priority from JP Application Serial Number 2020-008956, filed Jan. 23, 2020, the disclosure of which is hereby incorporated by reference herein in its entirety.

BACKGROUND

1. Technical Field

The present disclosure relates to a projection system and a projector.

2. Related Art

JP-A-2010-20344 describes a projector that enlarges and projects a projection image formed by an image formation section on a screen via a projection system. The projection system described in JP-A-2010-20344 is formed of a first optical system and a second optical system sequentially arranged from the reduction side toward the enlargement side. The first optical system is a refractive optical system including a plurality of lenses and extends linearly. The second optical system is formed of a reflection mirror having a concave reflection surface. The reflection mirror deflects a light flux incident from the side facing the first optical system back toward the first optical system. The image formation section includes a light source and a light valve. The image formation section forms a projection image in the reduction-side image formation plane of the projection system. The projection system forms an intermediate image in a position between the first optical system and the reflection surface and projects a final image on the screen disposed in the enlargement-side image formation plane of the projection system.

In the second optical system in the projection system, in which the reflection mirror deflects back the light flux incident from the side facing the first optical system to project the light flux, shortening the projection distance causes a decrease in the distance between the first optical system and the screen. Therefore, to ensure a space where the projection system is disposed, the size of the first optical system needs to be reduced in the projection direction.

SUMMARY

To solve the problem described above, a projection system according to an aspect of the present disclosure includes a first optical system including a plurality of lenses and a deflector, and a second optical system including an optical element having a concave reflection surface and disposed at an enlargement side of the first optical system. The deflector is disposed in one air gap of a plurality of air gaps provided between the lenses adjacent to each other in the first optical system, the air gap having a largest axial inter-surface distance in the first optical system. The first optical system includes a first section located at a reduction side of the deflector and a second section located on the enlargement side of the deflector. A first optical axis section that is an optical axis of the first section and a second optical axis section that is an optical axis of the second section intersect each other. The second section includes three or more lenses. The second section is shorter than the first section.

A projector according to another aspect of the present disclosure includes the projection system described above and an image formation section that forms a projection image in a reduction-side image formation plane of the projection system.

DESCRIPTION OF EXEMPLARY EMBODIMENTS

A projection system according to an embodiment of the present disclosure and a projector including the projection system will be described below in detail with reference to the drawings.

Projector

Figure 1:
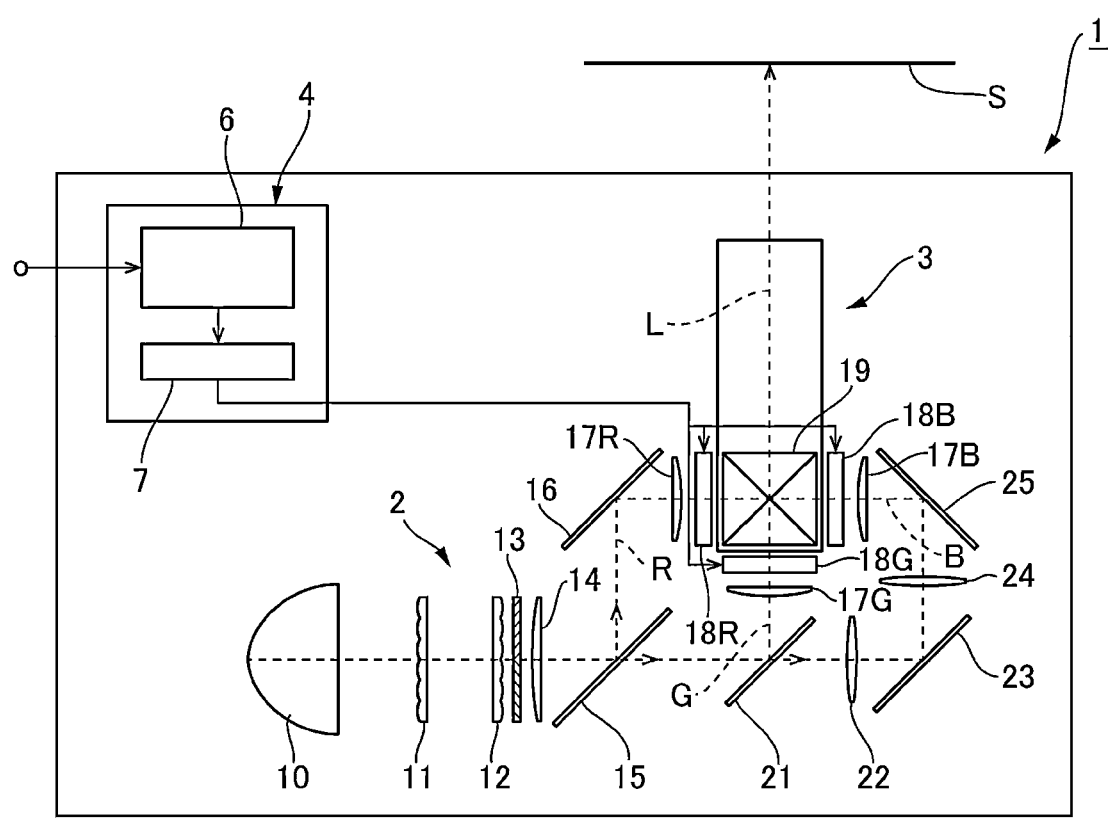
FIG. 1 is a schematic configuration diagram of a projector including a projection system.

FIG. 1 is a schematic configuration diagram of a projector including a projection system 3 according to the present disclosure. A projector 1 includes an image formation section 2, which generates a projection image to be projected on a screen S, the projection system 3, which enlarges the projection image and projects the enlarged image on the screen S, and a controller 4, which controls the action of the image formation section 2, as shown in FIG. 1.

Image Generation Optical System and Controller

The image formation section 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides the light flux from the light source 10 into a plurality of light fluxes. The lens elements of the first optical integration lens 11 focus the light flux from the light source 10 in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display area of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of the light rays incident via the superimposing lens 14, and transmits G light and B light, which are part of the light rays incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation section 2 further includes a second dichroic mirror 21, a field lens 17G, and the liquid crystal panel 18G. The second dichroic mirror 21 reflects the G light, which is part of the light rays via the first dichroic mirror 15, and transmits the B light, which is part of the light rays via the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation section 2 further includes a relay lens 22, a reflection mirror 23, a relay lens 24, a reflection mirror 25, a field lens 17B, and the liquid crystal panel 18B. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround a cross dichroic prism 19 in such a way that the liquid crystal panels 18R, 18G, and 18B face three sides of the cross dichroic prism 19. The cross dichroic prism 19, which is a prism for light combination, produces a projection image that is the combination of the light modulated by the liquid crystal panel 18R, the light modulated by the liquid crystal panel 18G, and the light modulated by the liquid crystal panel 18B.

The cross dichroic prism 19 forms part of the projection system 3. The projection system 3 enlarges and projects the projection images (images formed by liquid crystal panels 18R, 18G, and 18B) combined by the cross dichroic prism 19 on the screen S. The screen S is the enlargement-side image formation plane of the projection system 3.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of the corresponding color. The display driver 7 operates the liquid crystal panels 18R, 18G, and 18B based on the color projection image signals outputted from the image processor 6. The image processor 6 thus causes the liquid crystal panels 18R, 18G, and 18B to display projection images corresponding to the image signals.

Projection System

As the projection system 3 incorporated in the projector 1, a projection system 3A according to Example 1 and a projection system 3B according to Example 2 will be described below.

Example 1

The projection distance of the projection system 3A according to Example 1 can be changed among a prespecified reference distance J1, a short distance J2, which is shorter than the reference distance J1, and a long distance J3, which is longer than the reference distance J1.

Figure 2:
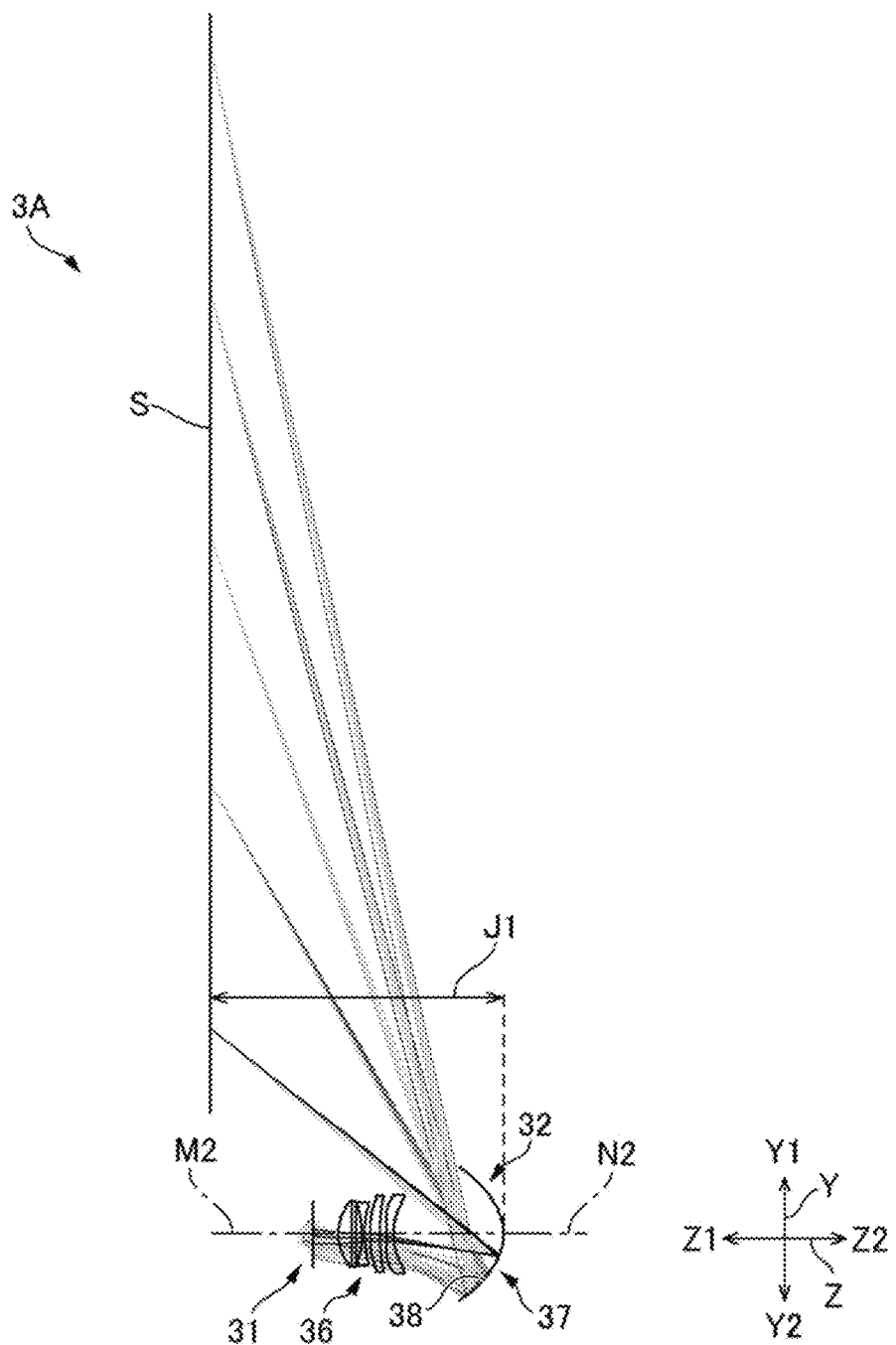
FIG. 2 is a light ray diagram of the entire projection system according to Example 1 viewed laterally.
Figure 3:
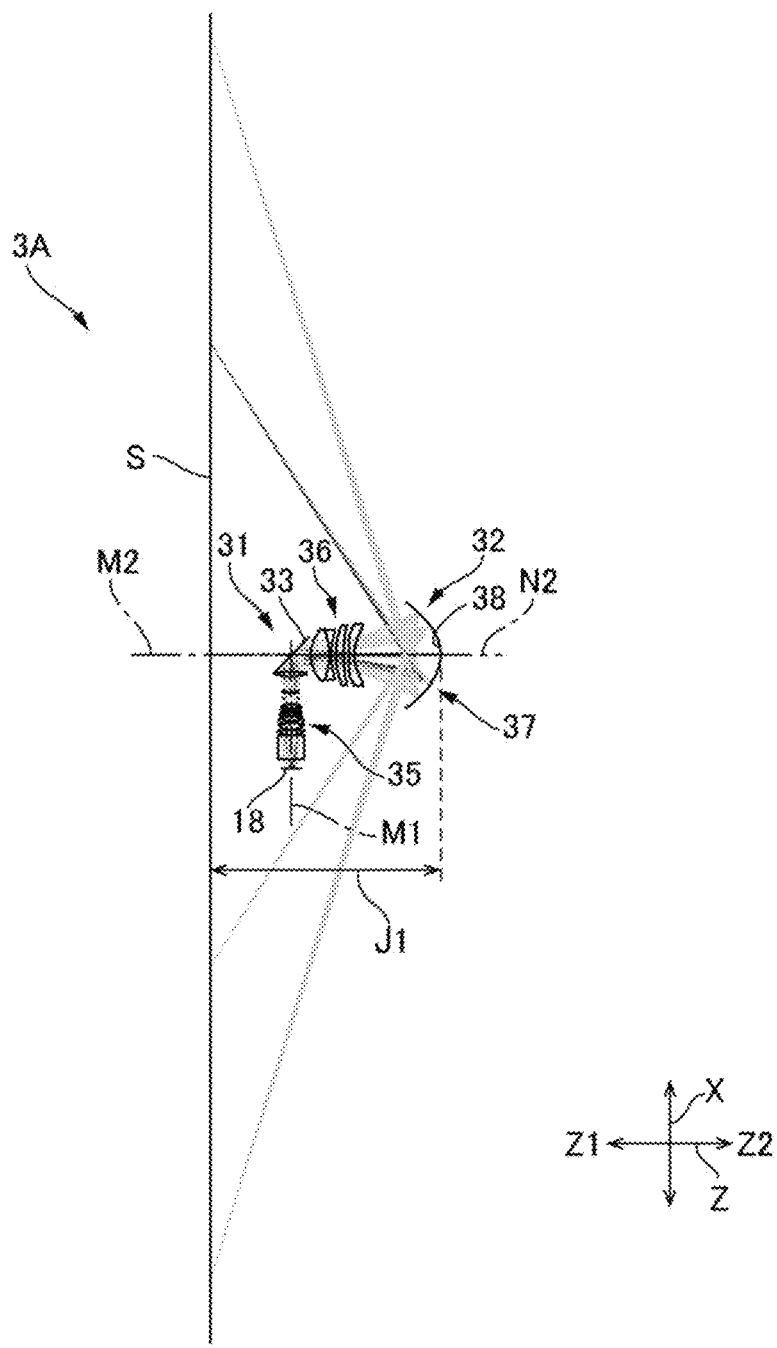
FIG. 3 is a light ray diagram of the entire projection system according to Example 1 viewed from above.
Figure 4:
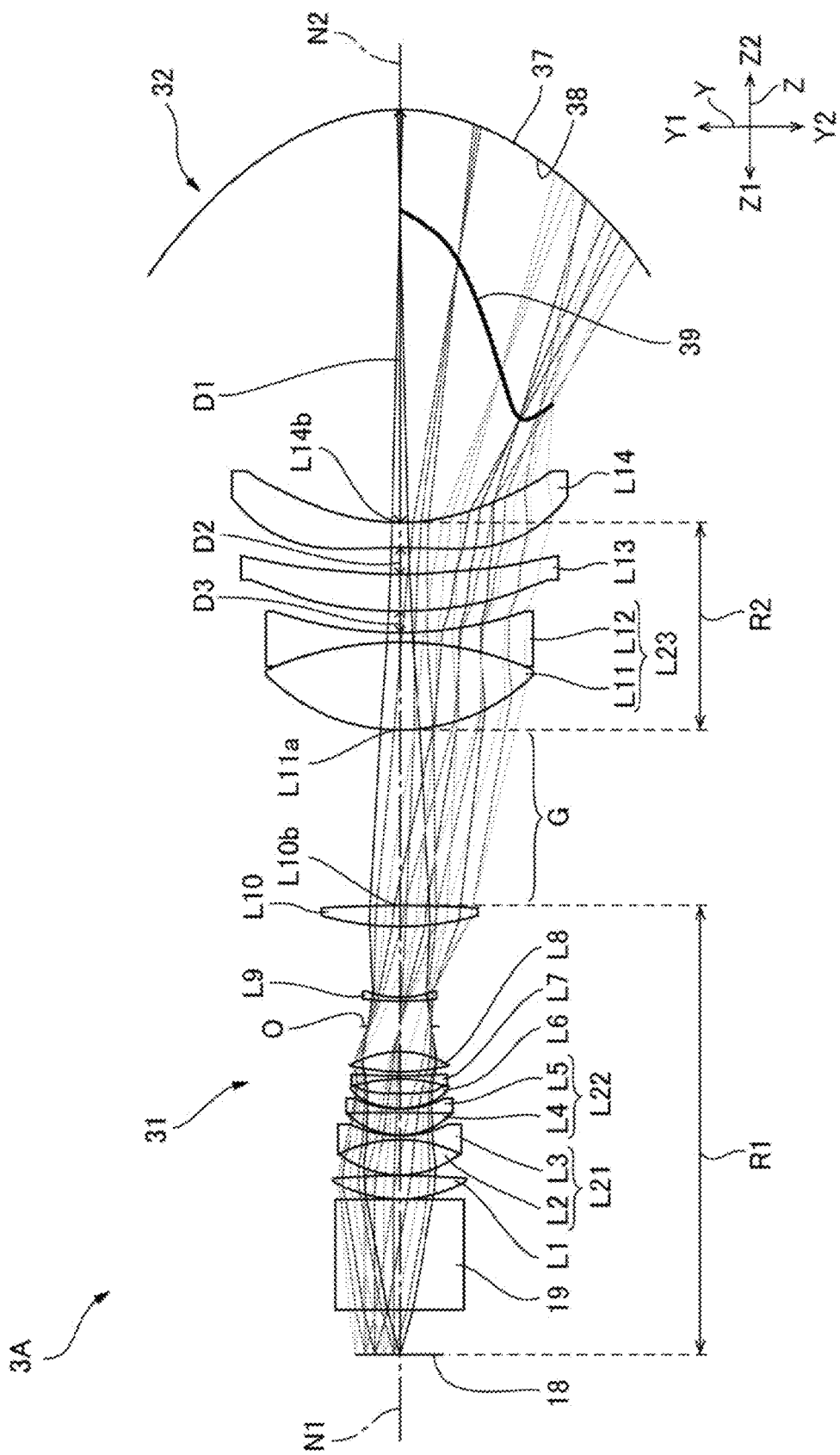
FIG. 4 describes a first optical system and a second optical system in Example 1.
Figure 5:
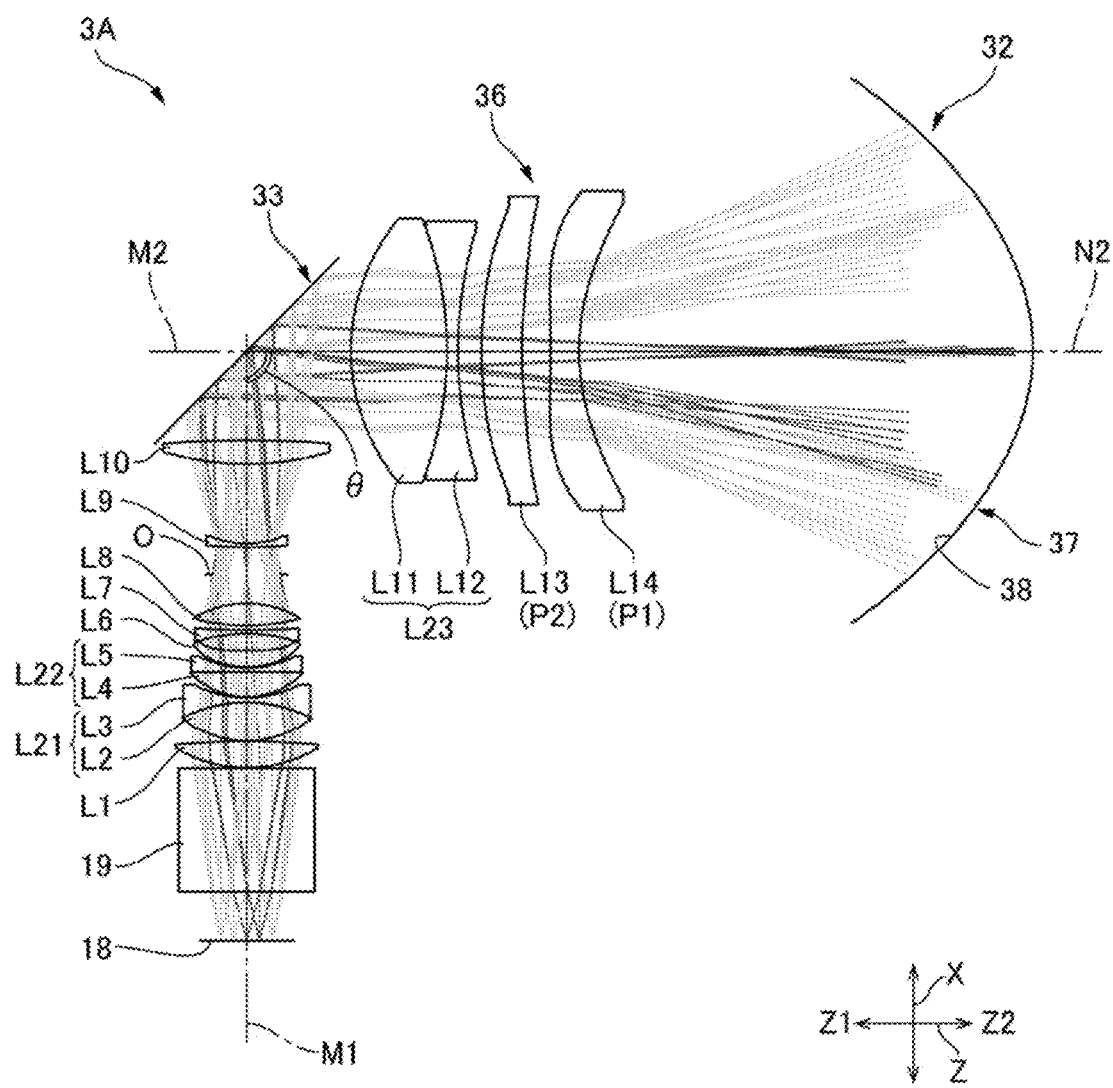
FIG. 5 is a light ray diagram of the projection system according to Example 1 viewed from above.

FIG. 2 is a light ray diagram diagrammatically showing the entire projection system 3A viewed laterally when the projection is performed over the reference distance J1. FIG. 3 is a light ray diagram diagrammatically showing the entire projection system 3A viewed from above in the upward/downward direction along the screen S when the projection is performed over the reference distance J1. FIG. 4 is a light ray diagram of the projection system 3A according to Example 1 viewed laterally. FIG. 4 shows a case where the projection system 3A is provided with no deflector. That is, FIG. 4 shows the state before a deflector is disposed in the projection system 3A. FIG. 5 is a light ray diagram of the projection system 3A according to Example 1 viewed from above. FIGS. 2 and 3 diagrammatically show five light fluxes that exit out of the projection system 3A according to the present example and reach the screen S. In the following figures and description, the liquid crystal panels 18R, 18G, and 18B are referred to as liquid crystal panels 18.

The projection system 3A is formed of a first optical system 31 and a second optical system 32 sequentially arranged from the reduction side toward the enlargement side, as shown in FIGS. 3, 4, and 5. The first optical system 31 is a refractive optical system including a plurality of lenses L1 to L14. The first optical system 31 includes a deflector 33 disposed in the middle of the optical path. The deflector 33 is a flat mirror. The deflector 33 is disposed in one of a plurality of air gaps provided between adjacent lenses in the first optical system 31, a first air gap G having the largest axial inter-surface distance along a first optical axis N1 of the first optical system 31. The thus disposed deflector 33 causes a first optical axis section M1, which is the optical axis of a first section 35 located at the reduction side of the deflector 33, and a second optical axis section M2, which is the optical axis of a second section 36 located at the enlargement side of the deflector 33, to intersect each other in the first optical system 31, as shown in FIG. 5. In the present example, an angle θ between the first optical axis section M1 and the second optical axis section M2 is 90°.

The second optical system 32 is formed of one optical element 37 having a concave reflection surface 38. The optical element 37 is a reflection mirror. The optical element 37 is disposed in the first optical axis N1. A second optical axis N2, which is the optical axis of the reflection surface 38, coincides with the second optical axis section M2 of the first optical axis N1.

The liquid crystal panels 18 of the image formation section 2 are disposed in the reduction-side image formation plane of the projection system 3A, as shown in FIG. 4. The liquid crystal panels 18 form the projection images at one side of the first optical axis N1 of the first optical system 31. The screen S is disposed in the enlargement-side image formation plane of the projection system 3A, as shown in FIGS. 2 and 3. A final image is projected on the screen S. The screen S is located on the same side of the first optical axis N1 as the side where the liquid crystal panels 18 form the projection images. An intermediate image 39 conjugate with the reduction-side image formation plane and the enlargement-side image formation plane is formed between the first optical system 31 and the reflection surface 38 of the optical element 37, as shown in FIG. 4. The intermediate image 39 is an image conjugate with the final image but turned upside down.

In the following description, three axes perpendicular to one another are called axes X, Y, and Z for convenience. The width direction of the screen S, which is the enlargement-side image formation plane, is called an axis-X direction, the upward/downward direction of the screen S is called an axis-Y direction, and the direction perpendicular to the screen S is called an axis-Z direction. The axis-Z direction toward the side where the screen S is located is called a first direction Z1, and the axis-Z direction toward the side where the projection system 3A is located is called a second direction Z2. The plane containing the second optical axis section M2 of the second optical system 32, the second optical axis N2 of the reflection surfaces 38 of the optical element 37, and the axis Y is called a plane YZ. The plane containing the first optical axis section M1 of the first optical system 31 and the second optical axis section M2 of the second optical system 32 is called a plane XZ.

FIGS. 3 and 5 are therefore each a light ray diagram in the plane XZ. The second optical axis section M2 of the first optical axis N1 and the second optical axis N2 extend in the axis-Z direction perpendicular to the screen S. The first optical axis section M1 extends in the axis-X direction parallel to the screen S. The liquid crystal panels 18 form the projection images at an upper side Y1 of the first optical axis N1. The screen S is disposed at the upper side Y1 of the first optical axis N1. The intermediate image 39 is formed at a lower side Y2 of the first optical axis N1.

The first optical system 31 includes the cross dichroic prism 19 and the 14 lenses L1 to L14, as shown in FIG. 4. The lenses L1 to L14 are arranged in the presented order from the reduction side toward the enlargement side. In the present example, the lenses L2 and L3 are bonded to each other into a first jointed lens L21. The lenses L4 and L5 are bonded to each other into a second jointed lens L22. The lenses L11 and L12 are bonded to each other into a third jointed lens L23. An aperture O is disposed between the lens L8 and the lens L9.

Out of the plurality of air gaps provided between adjacent lenses in the first optical system 31, the first air gap G having the largest axial inter-surface distance along the first optical axis N1 of the first optical system 31 is the gap between the lens L10 and the lens L11, that is, the gap between the lens L10 and the third jointed lens L23. The deflector 33 is disposed in the first air gap G and deflects the first optical axis N1 of the first optical system 31 by 90°.

In the first optical system 31, the first section 35 located at the reduction side of the deflector 33 is formed of the lenses L1 to L10. In the first optical system 31, the second section 36 located at the enlargement side of the deflector 33 is formed of the lenses L11 to L14. That is, the second section 36 includes the third jointed lens L23, the lens L13 (second lens), and the lens L14 (first lens). The positions of the lenses L14 and L13 are called a first reference position P1 and a second reference position P2, respectively, when the projection distance is the reference distance J1. The third jointed lens L23 is formed of a positive lens and a negative lens. In the present example, the lens L11 is the positive lens, and the lens L12 is the negative lens. The lens L13 has aspheric surfaces both at the enlargement and reduction sides. The lens L14 has aspheric surfaces both at the enlargement and reduction sides. The lenses L13 and L14 are each made of resin.

The optical element 37 is designed by using the second optical axis N2 of the reflection surface 38 as the axis in the design stage. In other words, the second optical axis N2 is the design-stage optical axis of the reflection surface 38. The reflection surface 38 is located at the lower side Y2 of the second optical axis N2, as shown in FIG. 4. In the present example, the reflection surface 38 has a rotationally symmetric shape around the second optical axis N2. The reflection surface 38 is provided within an angular range of 180° around the second optical axis N2. The reflection surface 38 is an aspheric surface. The reflection surface 38 may instead be a free-form surface. In this case, the free-form surface is designed by using the second optical axis N2 as the design-stage axis. Therefore, also when the reflection surface 38 is a free-form surface in the projection system. 3A, the second optical axis N2 of the reflection surface 38 is called the optical axis of the optical element 37.

Lens Data

Data on the lenses of the projection system 3A when the projection distance is the reference distance J1 are listed below. The surfaces of the lenses are numbered sequentially from the enlargement side toward the reduction side. An aspheric surface has a surface number preceded by *. Reference characters are given to the lenses and the mirror. Data labeled with a surface number that does not correspond to any of the lenses or the mirror is dummy data. Reference character r denotes the radius of curvature. Reference character d denotes the axial inter-surface distance. Reference character nd denotes the refractive index. Reference character vd denotes the Abbe number. Reference character Y denotes the effective radius. Reference characters r, d, and Y are each expressed in millimeters.

| Surface number | Name | r | d | nd | vd | Mode | Y |
|---|---|---|---|---|---|---|---|
| Object plane | S | 0 | 0 | | | Refraction | |
| 1 | | 0 | 300.6 | | | Refraction | 1970.754 |
| *2 | 38 | −49.23267 | −112.69379 | | | Reflection | 64.433 |
| *3 | L14 | 56.59199 | −6.992552 | 1.531131 | 55.75 | Refraction | 36.133 |

-continued

| Surface number | Name | r | d | nd | vd | Mode | Y |
|---|---|---|---|---|---|---|---|
| *4 |  | −202.16766 | −7.25376 |  |  | Refraction | 37.156 |
| *5 | L13 | 81.25321 | −9.968793 | 1.531131 | 55.75 | Refraction | 35.821 |
| *6 |  | 104.82638 | −5.840915 |  |  | Refraction | 35.106 |
| 7 | L12 | 100.68717 | −2.739165 | 1.953747 | 32.32 | Refraction | 29.996 |
| 8 | L11 | −87.89124 | −23.831858 | 1.437001 | 95.1 | Refraction | 29.8 |
| 9 |  | 49.89052 | −25.995 |  |  | Refraction | 30.706 |
| 10 | 33 | 0 | 22 |  |  | Reflection | 30.667 |
| 11 | L10 | 295.96509 | 5.708155 | 1.75211 | 25.05 | Refraction | 19.357 |
| 12 |  | −74.4767 | 19.4246 |  |  | Refraction | 19 |
| 13 | L09 | −24.67898 | 0.946601 | 1.870705 | 40.73 | Refraction | 9.164 |
| 14 |  | −99.2473 | 6.895388 |  |  | Refraction | 9.155 |
| Aperture plane | O | 0 | 7.024006 |  |  | Refraction | 8.5 |
| 16 | L08 | 25.93243 | 5.381552 | 1.69895 | 30.05 | Refraction | 12.411 |
| 17 |  | −52.98034 | 1.057334 |  |  | Refraction | 12.384 |
| 18 | L07 | −235.13984 | 0.905805 | 1.658436 | 50.85 | Refraction | 11.842 |
| 19 |  | 40.08846 | 3.989475 |  |  | Refraction | 11.487 |
| *20 | L06 | −208.11758 | 4.041041 | 1.58913 | 61.15 | Refraction | 11.484 |
| *21 |  | −21.23016 | 0.2 |  |  | Refraction | 12.063 |
| 22 | L05 | −26.6921 | 1.015552 | 1.910822 | 35.25 | Refraction | 11.942 |
| 23 | L04 | 1041.21309 | 6.030591 | 1.496997 | 81.61 | Refraction | 12.694 |
| 24 |  | −19.61022 | 0.2 |  |  | Refraction | 12.961 |
| 25 | L03 | −28.7697 | 1.184915 | 1.858833 | 30 | Refraction | 12.905 |
| 26 | L02 | 35.5408 | 9.552012 | 1.592824 | 68.62 | Refraction | 14.635 |
| 27 |  | −25.54672 | 0.2 |  |  | Refraction | 15.176 |
| 28 | L01 | 206.48587 | 6.445108 | 1.593493 | 67 | Refraction | 16.355 |
| 29 |  | −34.08038 | 0.1 |  |  | Refraction | 16.5 |
| 30 | 19 | 0 | 30.093 | 1.51633 | 64.14 | Refraction | 15.678 |
| 31 |  | 0 | 12.289 |  |  | Refraction | 12.079 |
| Image plane | 18 | 0 | 0 |  |  | Refraction | 11.594 |

The eccentricity type of the surface number 10 of the deflector 33 is a decenter and bend type. Eccentricity data is $\beta=45$. The aspheric constants of each of the aspheric surfaces are listed below.

| Surface number | 2 |
|---|---|
| Conic constant | −8.308679E−01 |
| Fourth-order coefficient | 5.437761E−07 |
| Sixth-order coefficient | −1.332766E−10 |
| Eighth-order coefficient | 2.800604E−14 |
| Tenth-order coefficient | −4.572199E−18 |
| Twelfth-order coefficient | 3.980803E−22 |
| Fourteenth-order coefficient | −1.920941E−26 |

| Surface number | 3 |
|---|---|
| Conic constant | 4.714359E−01 |
| Fourth-order coefficient | 4.155519E−07 |
| Sixth-order coefficient | −3.720156E−09 |
| Eighth-order coefficient | 2.228776E−12 |
| Tenth-order coefficient | −5.323326E−16 |

| Surface number | 4 |
|---|---|
| Conic constant | −5.12792E+01 |
| Fourth-order coefficient | 5.458571E−06 |
| Sixth-order coefficient | −9.843486E−11 |
| Eighth-order coefficient | −6.289547E−13 |
| Tenth-order coefficient | 1.913166E−16 |

| Surface number | 5 |
|---|---|
| Conic constant | −2.337328E+01 |
| Fourth-order coefficient | −7.181038E−06 |
| Sixth-order coefficient | 1.116968E−08 |
| Eighth-order coefficient | −6.253089E−12 |
| Tenth-order coefficient | 1.205875E−15 |

-continued

| Surface number | 6 |
|---|---|
| Conic constant | 4.405623E+00 |
| Fourth-order coefficient | −1.183644E−06 |
| Sixth-order coefficient | 2.75079E−09 |
| Eighth-order coefficient | −2.078892E−12 |
| Tenth-order coefficient | 3.434257E−16 |

| Surface number | 20 |
|---|---|
| Conic constant | 2.6329E+01 |
| Fourth-order coefficient | −4.454811E−05 |
| Sixth-order coefficient | −1.667027E−07 |
| Eighth-order coefficient | −1.153712E−09 |
| Tenth-order coefficient | −3.700696E−12 |

| Surface number | 21 |
|---|---|
| Conic constant | −5.033838E−02 |
| Fourth-order coefficient | 2.077345E−05 |
| Sixth-order coefficient | −8.180631E−08 |
| Eighth-order coefficient | −1.244181E−09 |

A first length R1, which is the overall length of the first section 35, is longer than a second length R2, which is the overall length of the second section 36, as indicated by the lens data. That is, a first length R1, which is the length from the liquid crystal panels 18, which are located in the reduction-side image formation plane, to an enlargement-side surface L10b of the lens L10, is longer than the second length R2, which is the length from a reduction-side surface L11a of the lens L11 to an enlargement-side surface L14b of the lens L14, as shown in FIG. 4. In other words, the second length R2, which is the overall length of the second section 36, is shorter than the first length R1, which is the overall length of the first section 35. In the present example, the first length R1 is 122.684 mm, and the second length R2 is 56.627 mm.

In the third jointed lens L23, the refractive index of the lens L11, which is a positive lens, is smaller than the refractive index of the lens L12, which is a negative lens. An example of the combination of the lenses that form the jointed lens may be C7 and F2 manufactured by HOYA Corporation. The relationship between the partial dispersion ratio Pgf and the Abbe number vd of C7 and those of F2 provides a straight line, and the gradient of the straight line is $K\_C7F2=|(Pgf\_C7-Pgf\_F2)/(vd\_C7-vd\_F2)|=0.0018$. To reduce the chromatic aberrations based on the combination of the two glass materials, a combination that allows a small gradient may be selected. In the present example, the glass material of L11 is FCD100 manufactured by HOYA Corporation, and the glass material of L12 is TAFD45 manufactured by HOYA Corporation. Therefore, the partial dispersion ratio of L11 Pgf_L11 is 0.5336, the Abbe number vd_L11 is 95.103, the partial dispersion ratio of L12 Pgf_L12 is 0.5901, and the Abbe number vd_L12 is 32.318. Therefore, when $|(Pgf\_L11-Pgf\_L12)/(vd\_L11-vd\_L12)|$ is defined as K_L11L12, K=0.0009, and the following conditional expression is satisfied:

K_L11L12<K_C7F2

That is, K_C7F2=0.0018.

Further, K_L11l12=0.0009.

Movable Lens

In the projection system 3A according to the present example, the lenses L14 and L13 of the first optical system 31 are movable in the axis-Z direction.

Figure 6:
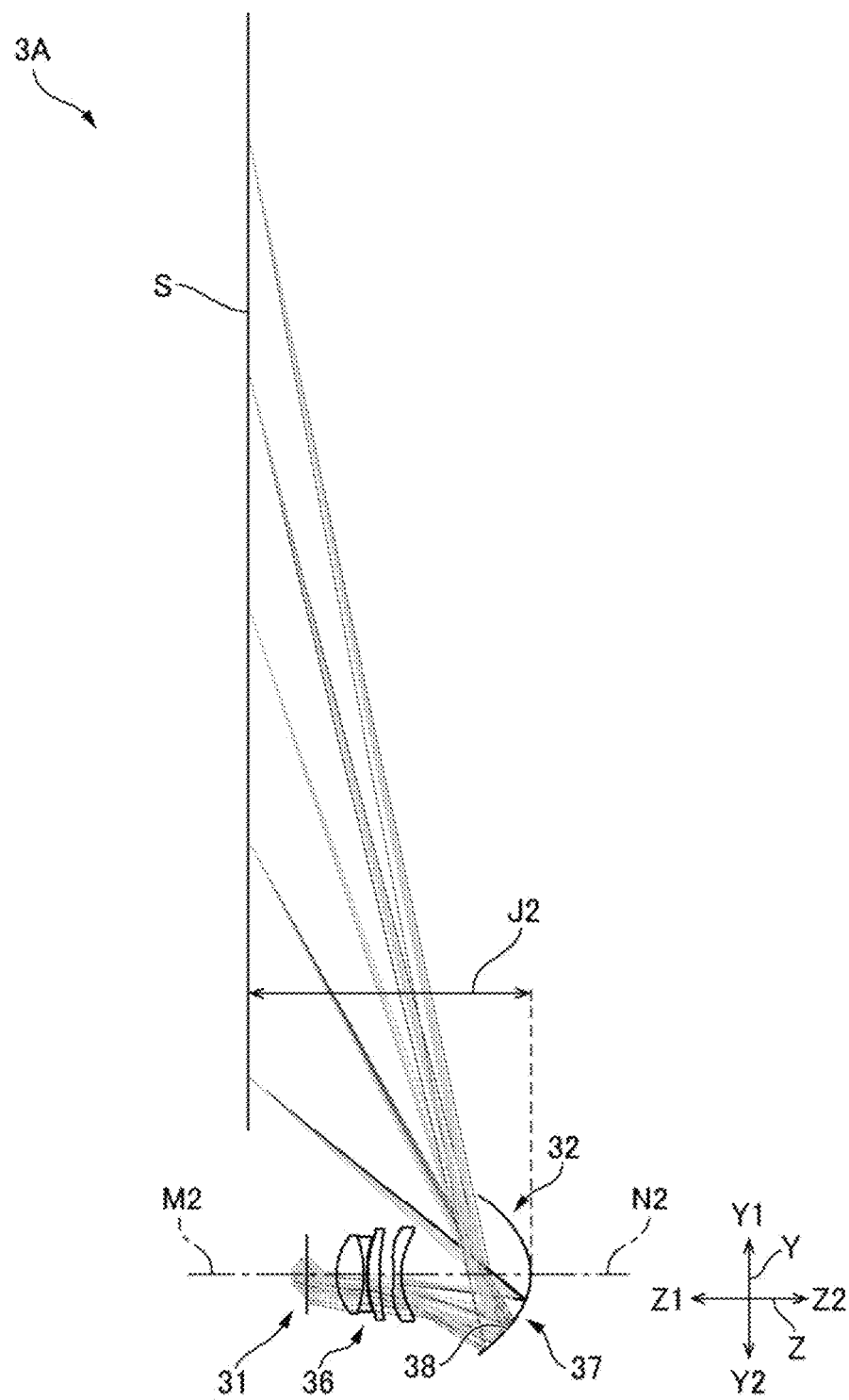
FIG. 6 is a light ray diagram of the entire projection system viewed laterally when projection is performed over a short distance.
Figure 7:
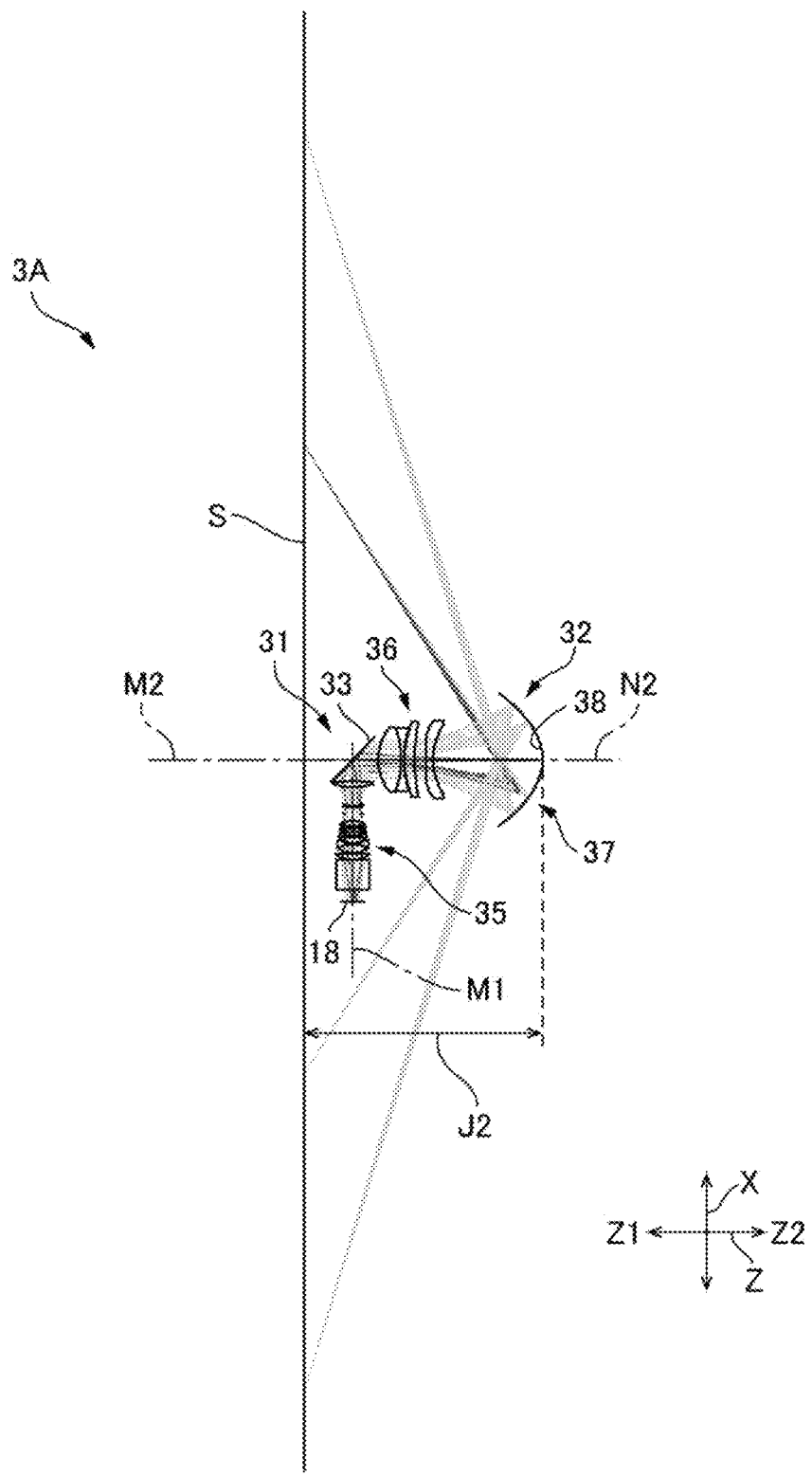
FIG. 7 is a light ray diagram of the entire projection system viewed from above when projection is performed over the short distance.
Figure 8:
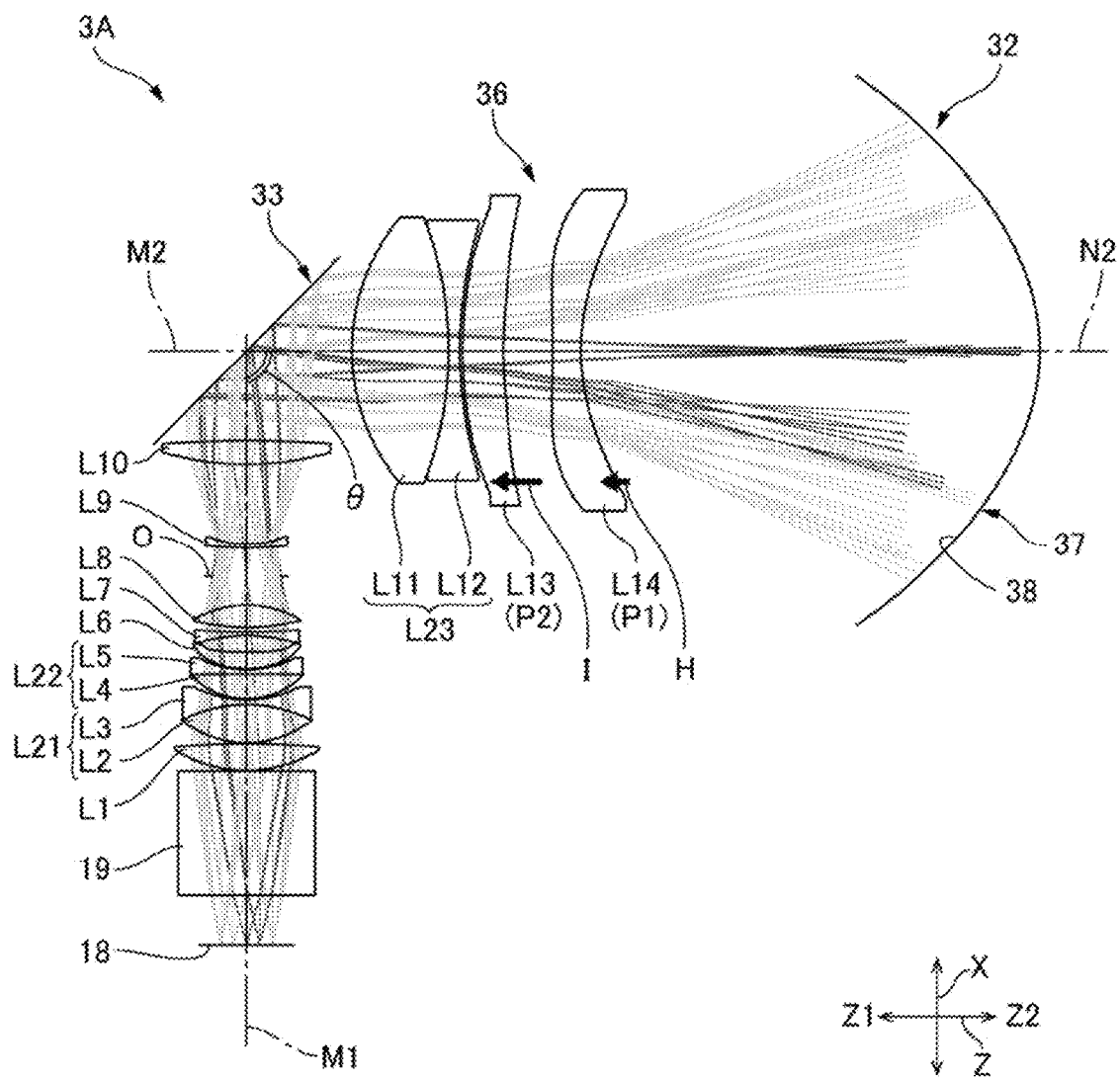
FIG. 8 describes the movement direction in which lenses are moved when projection is performed over the short distance.
Figure 9:
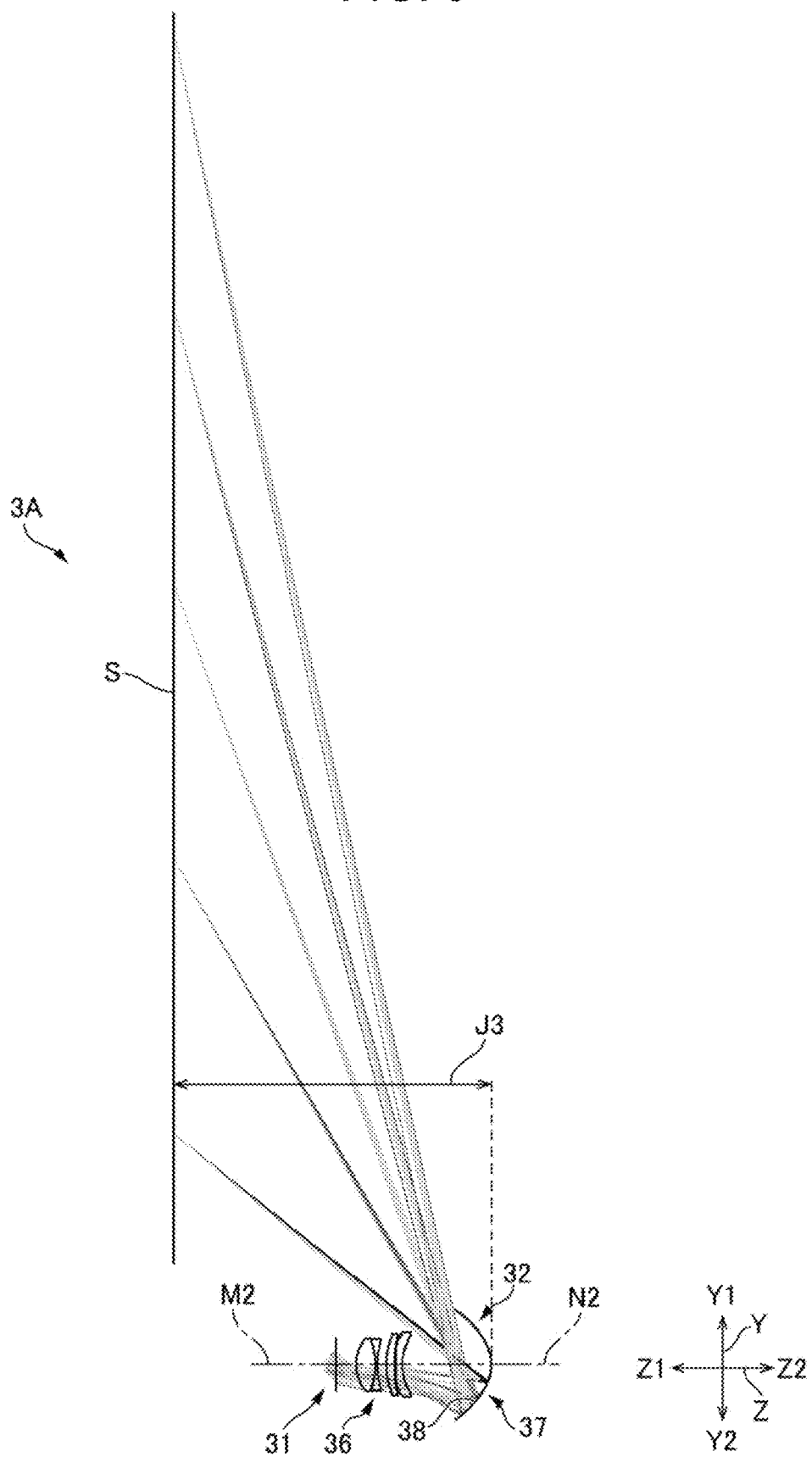
FIG. 9 is a light ray diagram of the entire projection system viewed laterally when projection is performed over a long distance.
Figure 10:
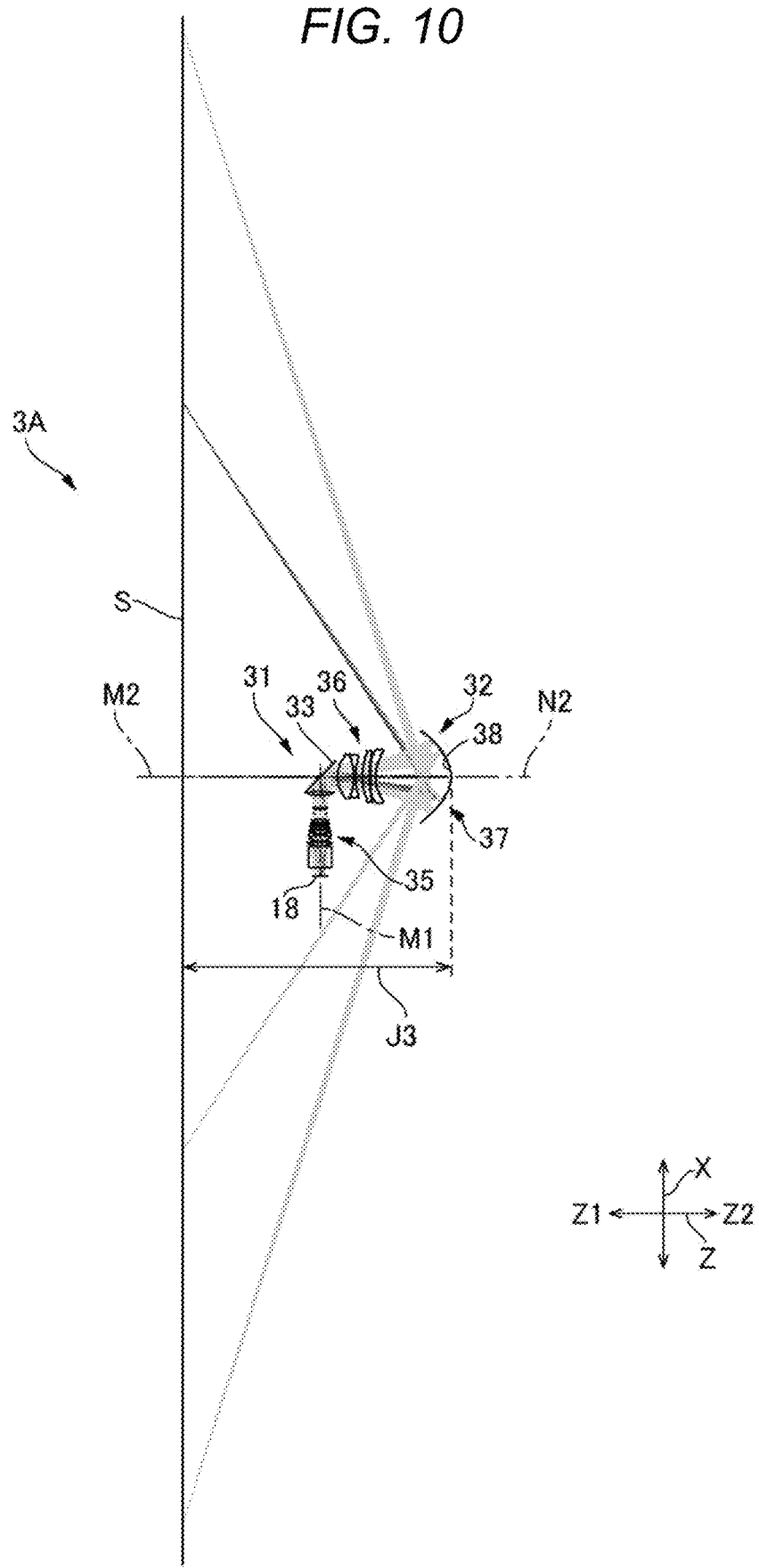
FIG. 10 is a light ray diagram of the entire projection system viewed from above when projection is performed over the long distance.
Figure 11:
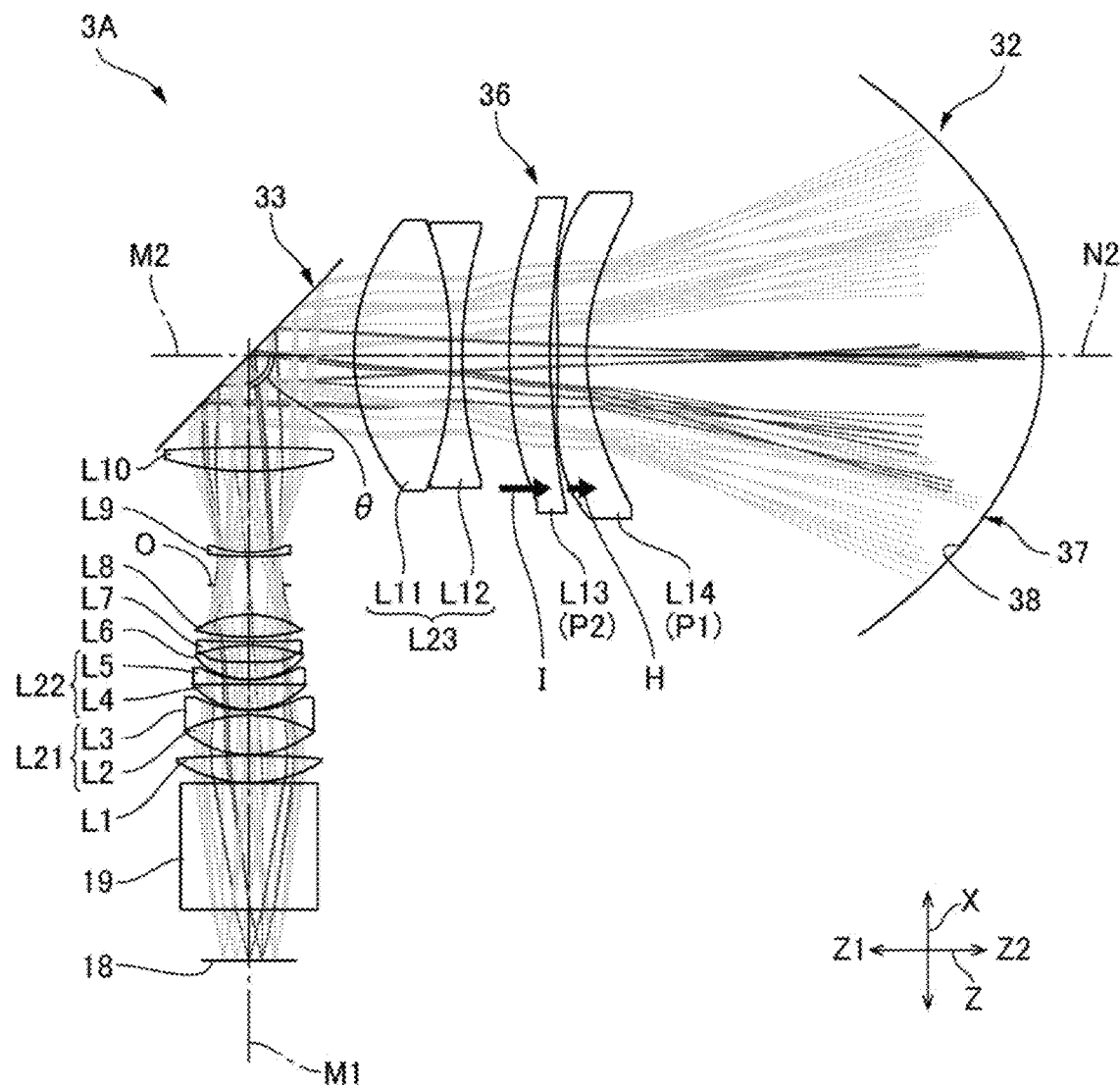
FIG. 11 describes the movement direction in which lenses are moved when projection is performed over the long distance.

FIG. 6 is a light ray diagram diagrammatically showing the entire projection system 3A viewed laterally when the projection is performed over the short distance J2. FIG. 7 is a light ray diagram diagrammatically showing the entire projection system 3A viewed from above when the projection is performed over the short distance J2. FIG. 8 describes the movement direction in which the lenses L14 and L13 are moved when the projection is performed over the short distance J2. In FIG. 8, the first optical system 31 and the second optical system 32 are viewed from above. FIG. 9 is a light ray diagram diagrammatically showing the entire projection system 3A viewed laterally when the projection is performed over the long distance J3. FIG. 10 is a light ray diagram diagrammatically showing the entire projection system 3A viewed from above when the projection is performed over the long distance J3. FIG. 11 describes the movement direction in which the lenses L14 and L13 are moved when the projection is performed over the long distance J3. In FIG. 11, the first optical system 31 and the second optical system 32 are viewed from above. FIGS. 6, 7, 9, and 10 diagrammatically show five light fluxes that exit out of the projection system 3A according to the present example and reach the screen S. Light rays used in the simulation in each example are so weighted that the weighting ratio among light rays having a wavelength of 620 nm, light rays having a wavelength of 550 nm, and light rays having a wavelength of 470 nm is 2:7:1.

In the present example, when the projection distance of the projection system 3A is changed, the lenses L14 and L13 of the first optical system 31 are moved in the axis-Z direction. That is, when the projection distance is changed from the reference distance J1 to the long distance J3, the lens L14 is moved from the first reference position P1 in the second direction Z2, and the lens L13 is moved from the second reference position P2 in the second direction Z2, as indicated by the arrows H and I in FIG. 11. When the projection distance is changed from the reference distance J1 to the short distance J2, the lens L14 is moved from the first reference position P1 in the first direction Z1, and the lens L13 is moved from the second reference position P2 in the first direction Z1. The optical element 37 is fixed and is therefore not moved. The lenses L1 to L13 of the first optical system 31 are fixed.

In the projection system 3A, since the lenses L14 and L13 are movable, focusing can be performed. The axial inter-surface distances after completion of the movement of each optical member involved in the focusing are listed below. In the data on the axial inter-surface distances shown below, the values in the field labeled with the surface number 1 each represent the projection distance, which is the axial inter-surface distance between the reflection surface 38 of the optical element 37 and the screen S in the axis-Z direction. In other words, the values in the field labeled with the surface number 1 are the reference distance J1 shown in FIGS. 2 and 3, the short distance J2 shown in FIGS. 6 and 7, and the long distance J3 shown in FIGS. 9 and 10. The values in the field labeled with the surface number 2 each represent an axial inter-surface distance D1 between the reflection surface 38 of the optical element 37 and the lens L14 of the first optical system 31, as shown in FIG. 4. The values in the field labeled with the surface number 5 each represent an axial inter-surface distance D2 between the lens L14 and the lens L13 of the first optical system 31. The values in the field labeled with the surface number 6 each represent an axial inter-surface distance D3 between the lens L13 and the lens L12 of the first optical system 31. In other words, the values in the field labeled with the surface number 6 each represent the axial inter-surface distance D3 between the lens L13 and the third jointed lens L23 of the first optical system 31.

| Surface number | 1 | 2 (D1) | 5 (D2) | 6 (D3) |
|---|---|---|---|---|
| Reference distance J1 | 300.6 | −112.69379 | −7.253760169 | −5.840914653 |
| Short distance J2 | 245.8201358 | −112.9083761 | −12.14804445 | −0.732044248 |
| Long distance J3 | 399.6034469 | −112.2424833 | −2.045981489 | −11.5 |

When the projection distance is changed from the reference distance J1 to the long distance J3, the movement distance by which the lens L13 is moved in the direction labeled with the arrow I is longer than the movement distance by which the lens L14 is moved in the direction labeled with the arrow H, as indicated by the lengths of the arrows H and I in FIG. 8. When the projection distance is changed from the reference distance J1 to the short distance J2, the movement distance by which the lens L13 is moved in the direction labeled with the arrow I is longer than the movement distance by which the lens L14 is moved in the direction labeled with the arrow H, as indicated by the lengths of the arrows H and I in FIG. 11.

Effects and Advantages

The projection system 3A according to the present example includes the first optical system 31 and the second optical system 32 sequentially arranged from the reduction side toward the enlargement side. In the projection system 3A, the first optical system 31 includes the plurality of lenses and the deflector 33. The second optical system 32 includes the optical element 37 having the concave reflection surface 38. The deflector 33 is disposed in the first air gap G having the largest axial inter-surface distance along the first optical axis N1 of the first optical system 31 out of the plurality of air gaps provided between adjacent lenses in the first optical system 31. The thus disposed deflector 33 causes the first optical axis section M1, which is the optical axis of the first section 35 located at the reduction side of the deflector 33, and the second optical axis section M2, which is the optical axis of the second section 36 located at the enlargement side of the deflector 33, to intersect each other in the first optical system 31. The second section 36 includes the three lenses, and the second length R2, which is the overall length of the second section 36, is shorter than the first length R1, which is the overall length of the first section 35.

In the projection system 3A in the present example, in which the second optical system includes one reflection surface 38, the light rays from the side facing the first optical system 31 are deflected back toward the side where the first optical system 31 is located and are projected on the screen S. In the thus configured projection system 3A, shortening the projection distance causes a decrease in the distance between the first optical system 31 and the screen S. Therefore, to ensure a space where the projection system 3A is disposed, the size of the first optical system 31 needs to be reduced in the projection direction.

To solve the problem described above, the first optical system 31 includes the deflector 33 in the present example. The first optical system 31 can therefore be bent in the middle of the optical path thereof. In the first optical system 31, the second length R2 of the second section 36, out of which the light flux exits toward the reflection surface 38, is shorter than the first length R1 of the first section 35, which is located on the reduction side of the deflector 33. The size of the first optical system 31 can therefore be reduced in the projection direction in which the light flux is reflected off the reflection surface 38. Further, the deflector 33 is disposed in the first air gap G having the largest axial inter-surface distance along the first optical axis N1 of the first optical system 31. An increase in the size of the first optical system 31 resulting from the provision of the deflector 33 can therefore be avoided or suppressed.

In the present example, the angle between the first optical axis section M1 of the first section 35 and the second optical axis section M2 of the second section 36 is 90°. The size of the first optical system 31 can therefore be reduced in the axis-Z direction. When the angle between the first optical axis section M1 of the first section 35 and the second optical axis section M2 of the second section 36 is smaller than or equal to 90°, the size of the projector 1 including the first optical system 31 can be reduced in the axis-Z direction as compared with a case where the angle between the first optical axis section M1 and the second optical axis section M2 is greater than 90°.

In the present example, the reflection surface 38 is an aspheric surface. Occurrence of aberrations at the final image is therefore readily suppressed.

Further, the second section 36 includes the lens L14 and the lens L13, which is disposed at the reduction side from the lens L14. The lenses L14 and L13 each have aspheric surfaces at opposite sides. The lenses L14 and L13 are movable in the axis-Z direction along the first optical axis N1. Focusing can therefore be performed by moving the lenses L14 and L13 when the projection distance of the projection system 3A is changed.

In the present example, the lenses L13 and L14 of the first optical system 31 are each made of resin. The weight of the first optical system 31 can therefore be reduced as compared with a case where the lenses L13 and L14 are each made of glass. Further, when the lenses L13 and L14 are each made of resin, the lenses L13 and L14 are readily manufactured even when the lenses L13 and L14 each have aspheric surfaces.

The second section 36 includes the third jointed lens L23. Occurrence of the chromatic aberrations at the final image can therefore be suppressed. The third jointed lens L23 is formed of a positive lens and a negative lens, and the refractive index of the positive lens is smaller than the refractive index of the negative lens. Occurrence of the chromatic aberrations at the final image is therefore readily suppressed. Let K be the absolute value of the ratio between the difference in the partial dispersion ratio between L11 and L12 of the third jointed lens L23 and the difference in the Abbe number at the d line thereof, and let K_C7F2 be the absolute value of the ratio between the difference in the partial dispersion ratio between C7 and F2, which are typical lens materials, and the difference in the Abbe number at the d line thereof. K<K_C7F2 is then satisfied. Occurrence of the chromatic aberrations at the final image is therefore more readily suppressed.

It is noted that only the lens L14 may be movable in the axis-Z direction. Also in this case, focusing can be performed when the projection distance of the projection system 3A is changed. It is noted that only the lens L13 may be movable in the axis-Z direction. Also in this case, focusing can be performed when the projection distance of the projection system 3A is changed.

Example 2

Figure 12:
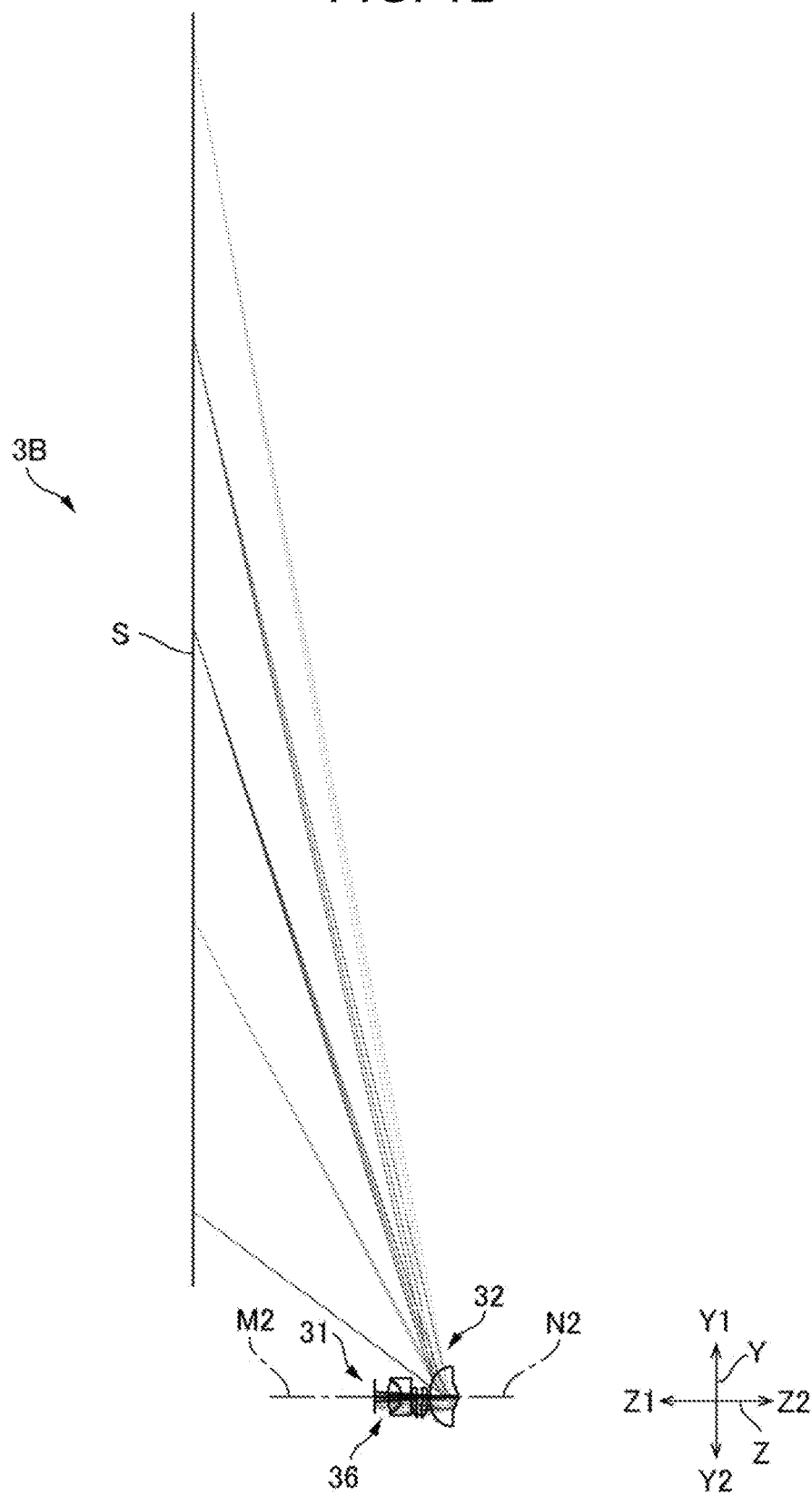
FIG. 12 is a light ray diagram of the entire projection system according to Example 2 viewed laterally.
Figure 13:
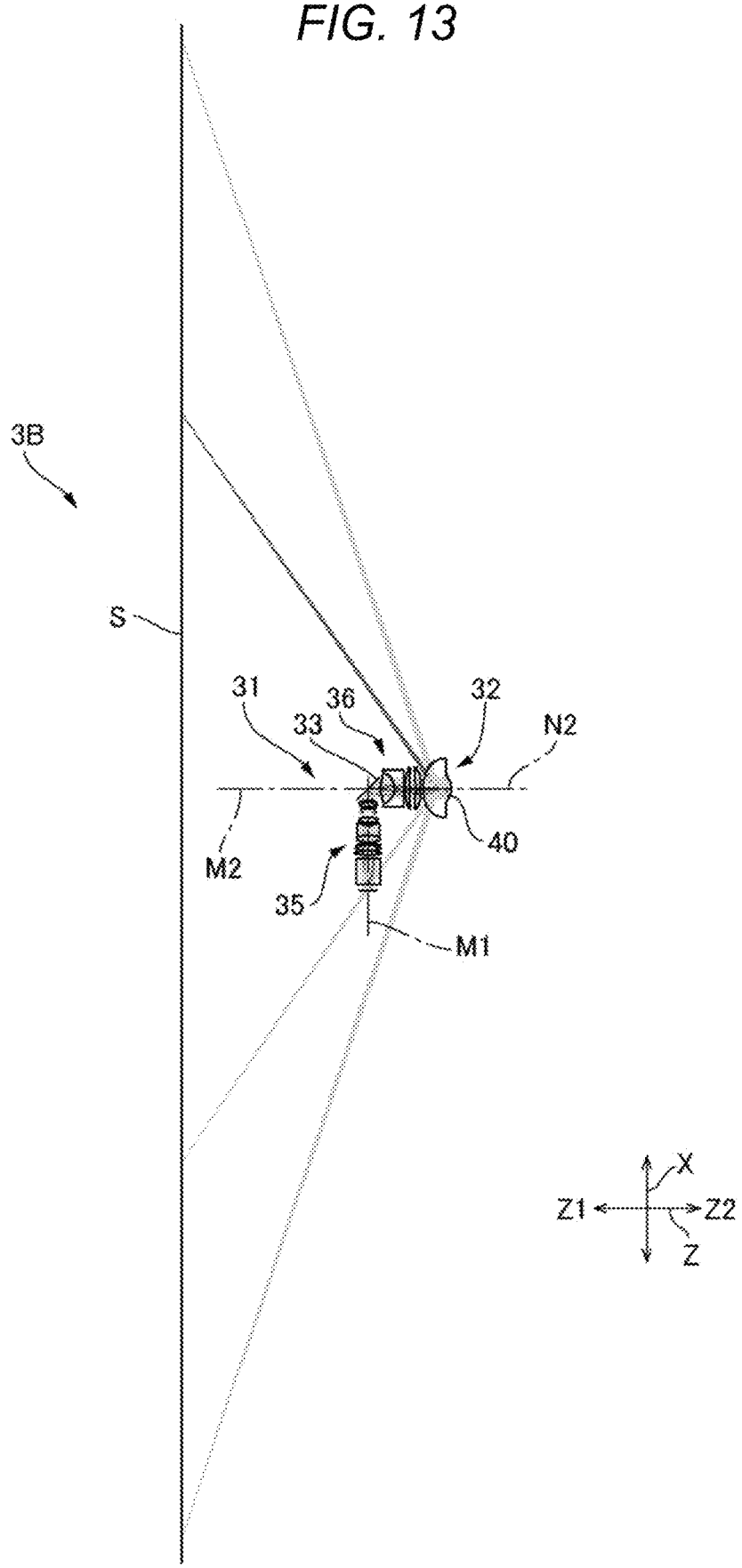
FIG. 13 is a light ray diagram of the entire projection system according to Example 2 viewed from above.
Figure 14:
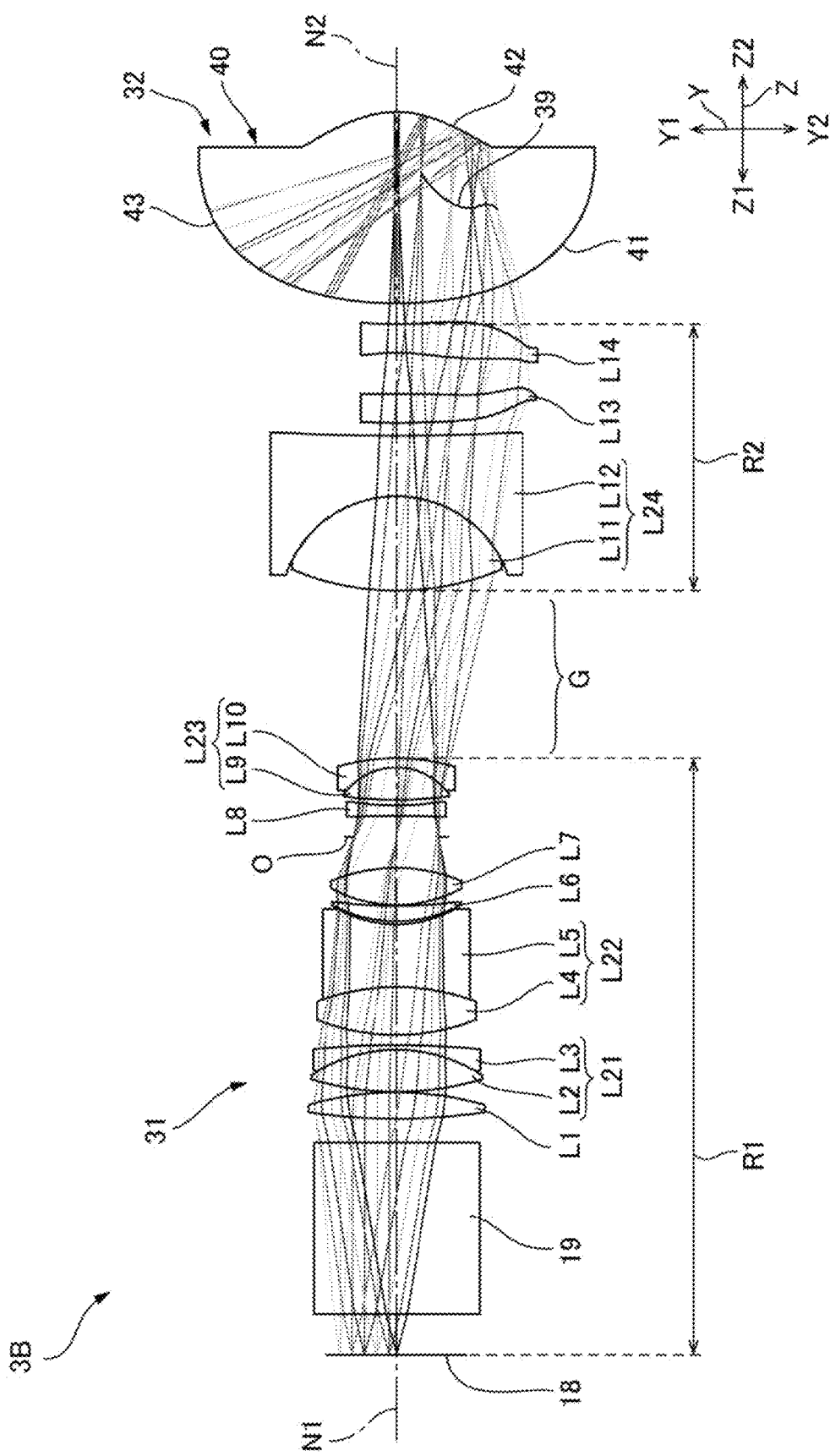
FIG. 14 is a light ray diagram of the projection system according to Example 2 viewed laterally.
Figure 15:
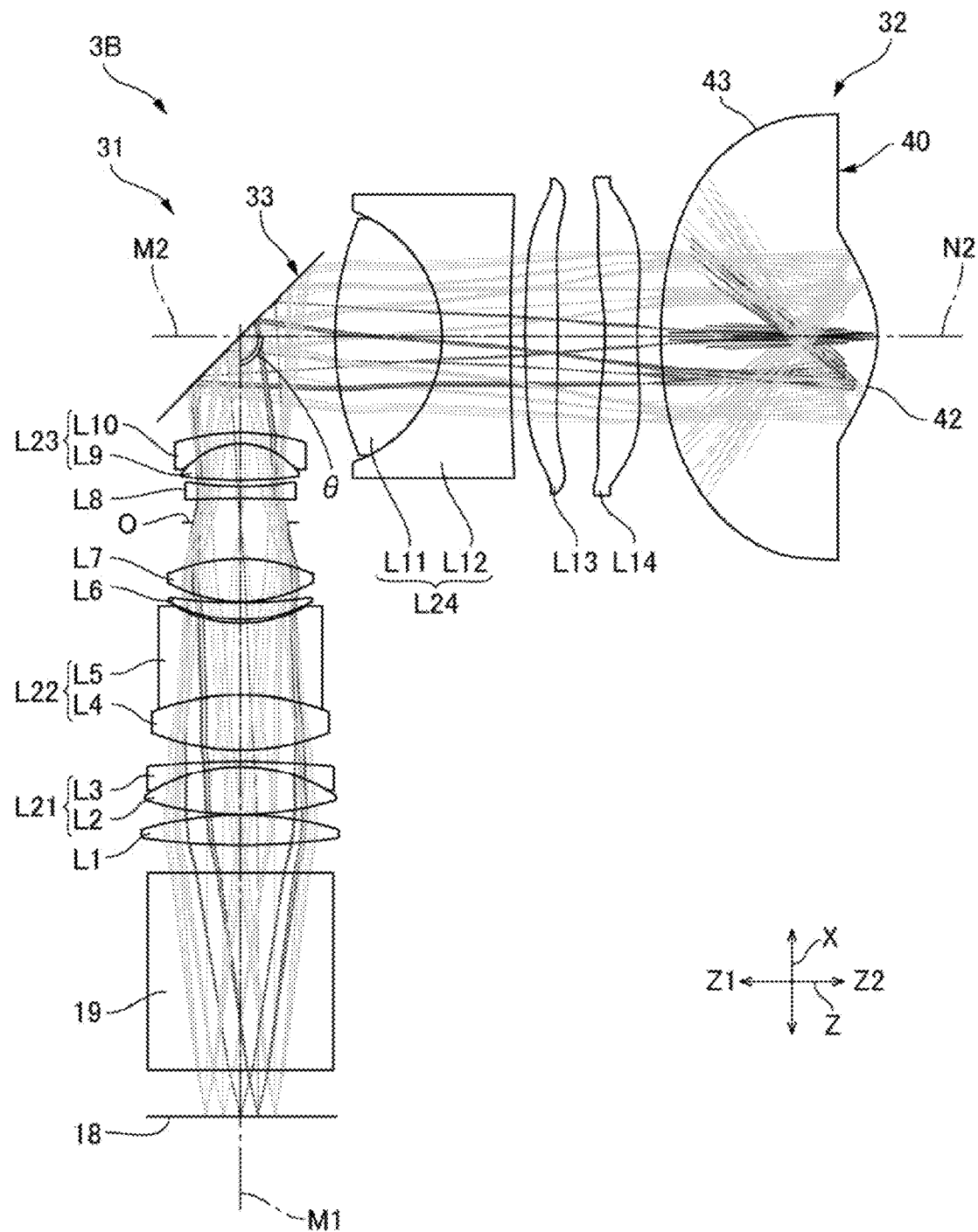
FIG. 15 is a light ray diagram of the projection system according to Example 2 viewed from above.
Figure 16:
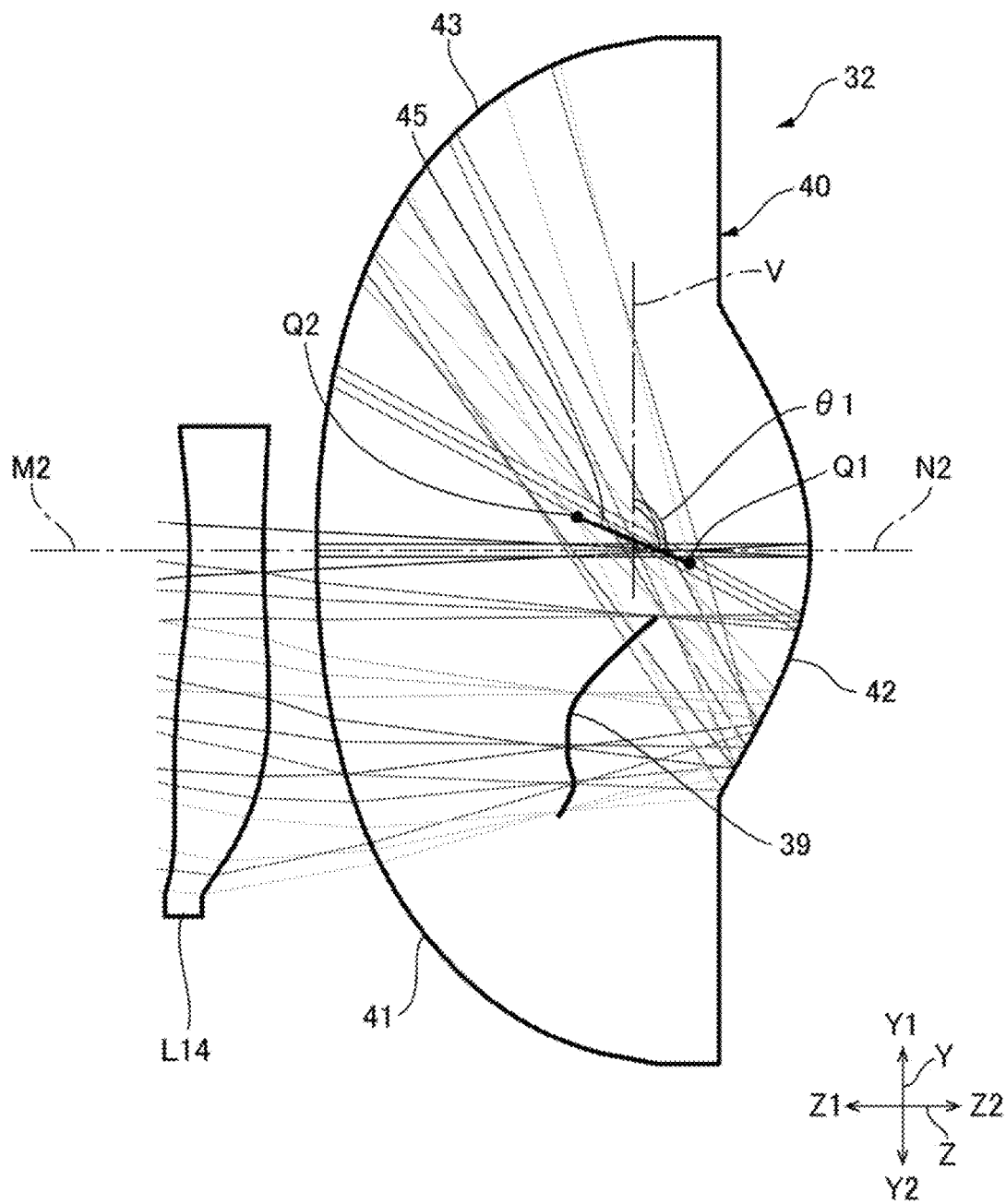
FIG. 16 is a light ray diagram of a second optical system in Example 2 viewed laterally.

FIG. 12 is a light ray diagram diagrammatically showing an entire projection system 3B according to Example viewed laterally. FIG. 13 is a light ray diagram diagrammatically showing the entire projection system 3B according to Example 2 viewed from above. FIG. 14 is a light ray diagram of the projection system 3B according to Example 2 viewed laterally. FIG. 14 shows a case where the projection system 3B is provided with no deflector 33. FIG. 15 is a light ray diagram of the projection system 3B according to Example 2 viewed from above. FIG. 16 is a light ray diagram of the projection system 3B according to Example 2 viewed laterally. The projection system 3B according to the present example has a configuration corresponding to that of the projection system 3A according to Example 1, and a corresponding component therefore has the same reference character in the description.

The projection system 3B is formed of the first optical system 31 and the second optical system 32 sequentially arranged from the reduction side toward the enlargement side, as shown in FIGS. 13 and 14. The first optical system 31 is a refractive optical system including a plurality of lenses. The first optical system 31 includes the deflector 33 disposed in the middle of the optical path, as shown in FIG. 15. The deflector 33 is a flat mirror. The deflector 33 is disposed in one of a plurality of air gaps provided between adjacent lenses in the first optical system 31, the first air gap G having the largest axial inter-surface distance along the first optical axis N1 of the first optical system 31, as shown in FIG. 14. The thus disposed deflector 33 causes the first optical axis section M1, which is the optical axis of the first section 35 located at the reduction side of the deflector 33, and the second optical axis section M2, which is the optical axis of the second section 36 located at the enlargement side of the deflector 33, to intersect each other in the first optical system 31, as shown in FIG. 15. The angle θ between the first optical axis section M1 and the second optical axis section M2 is 90°. The second optical axis section M2 extends in the axis-Z direction perpendicular to the screen S. The first optical axis section M1 extends in the axis-X direction parallel to the screen S.

The second optical system 32 is formed of one optical system 40, as shown in FIG. 14. The optical element 40 has a first transmissive surface 41, a reflection surface 42, and a second transmissive surface 43 sequentially arranged from the reduction side toward the enlargement side. The first transmissive surface 42 has a convex shape protruding toward the reduction side. The reflection surface 42 has a concave shape. The second transmissive surface 43 has a convex shape protruding toward the enlargement side. The optical element 40, which forms the second optical system 32, is disposed in the first optical axis N1 of the first optical system 31. In the second optical system 32, the second optical axis N2, which is the optical axis of the reflection surface 42, coincides with the first optical axis N1.

The liquid crystal panels 18 of the image formation section 2 are disposed in the reduction-side image formation plane of the projection system 3B. The liquid crystal panels 18 form projection images at the upper side Y1 of the first optical axis N1 of the first optical system 31, as shown in FIG. 14. The screen S is disposed at the upper side Y1 of the first optical axis N1 of the first optical system 31, as shown in FIG. 12. The final image is projected on the screen S. The screen S is located at the same side of the first optical axis N1 as the side where the liquid crystal panels 18 form the projection images. That is, the screen S is disposed at the upper side Y1 of the first optical axis N1. The intermediate image 39 conjugate with the reduction-side image formation plane and the enlargement-side image formation plane is formed between the first optical system 31 and the reflection surface 42 of the optical element 40, as shown in FIGS. 14 and 16. The intermediate image 39 is an image conjugate with the final image but turned upside down. In the present example, the intermediate image 39 is formed inside the optical element 40. More specifically, the intermediate image 39 is formed between the first transmissive surface 41 and the reflection surface 42 of the optical element 40.

The first optical system 31 includes the cross dichroic prism 19 and the 14 lenses L1 to L14, as shown in FIGS. 14 and 15. The lenses L1 to L14 are arranged in the presented order from the reduction side toward the enlargement side. In the present example, the lenses L2 and L3 are bonded to each other into the first jointed lens L21. The lenses L4 and L5 are bonded to each other into the second jointed lens L22. The lenses L9 and L10 are bonded to each other into the third jointed lens L23. The lenses L11 and L12 are bonded to each other into a fourth jointed lens L24. The aperture O is disposed between the lens L7 and the lens L8.

Out of the plurality of air gaps provided between adjacent lenses in the first optical system 31, the first air gap G having the largest axial inter-surface distance along the first optical axis N1 of the first optical system 31 is the gap between the lens L10 and the lens L11, that is, the gap between the third jointed lens L23 and the fourth third jointed lens L24, as shown in FIG. 14. The deflector 33 is disposed in the first air gap G and deflects the first optical axis N1 of the first optical system 31 by 90°.

In the first optical system 31, the first section 35 located at the reduction side of the deflector 33 is formed of the lenses L1 to L10. In the first optical system 31, the second section 36 located at the enlargement side of the deflector 33 is formed of the lenses L11 to L14. That is, the second section 36 includes the fourth jointed lens L24, the lens L13 (second lens), and the lens L14 (first lens).

The fourth jointed lens L24 is formed of a positive lens and a negative lens. In the present example, the lens L11 is the positive lens, and the lens L12 is the negative lens. The lens L13 has aspheric surfaces both at the enlargement and reduction sides. The lens L14 has aspheric surfaces both at the enlargement and reduction sides. The lenses L13 and L14 are each made of resin.

The optical element 40 is designed by using the second optical axis N2 of the reflection surface 42 as the axis in the design stage. In other words, the second optical axis N2 is the design-stage optical axis of the first transmissive surface 41, the second transmissive surface 43, and the reflection surface 42. The first transmissive surface 41 and the reflection surface 42 are located at the lower side Y2 of the second optical axis N2, and the second transmissive surface 43 is located at the upper side Y1 of the second optical axis N2, as shown in FIG. 14. In the present example, the first transmissive surface 41, the reflection surface 42, and the second transmissive surface 43 each have a rotationally symmetric shape around the second optical axis N2. The first transmissive surface 41, the reflection surface 42, and the second transmissive surface 43 are provided within the angular range of 180° around the second optical axis N2.

The first transmissive surface 41, the reflection surface 42, and the second transmissive surface 43 of the optical element 40 are each an aspheric surface. The reflection surface 42 is a reflection coating layer provided on a surface of the optical element 40 that is the surface opposite the first transmissive surface 41. The first transmissive surface 41, the reflection surface 42, and the second transmissive surface 43 may instead each be a free-form surface. In this case, the free-form surfaces are designed by using the second optical axis N2 as the design-stage axis. Therefore, also when any of the first transmissive surface 41, the reflection surface 42, and the second transmissive surface 43 is a free-form surface in the projection system 3B, the second optical axis N2 of the reflection surface 42 is called the optical axis of the optical element 40.

A pupil 45 of the second optical system 32 is located inside the optical element 40, as shown in FIG. 16. The pupil 45 of the second optical system 32 in the plane YZ is defined by the line that connects an upper intersection Q1, where an upper peripheral light ray of an upper end light flux passing through the axis-Y-direction upper end of an effective light ray range of the second transmissive surface 43 and an upper peripheral light ray of a lower end light flux passing through the axis-Y-direction lower end of the effective light ray range intersect each other in the plane YZ, to a lower intersection Q2, where a lower peripheral light ray of the upper end light flux and a lower peripheral light ray of the lower end light flux intersect each other in the plane YZ.

The pupil 45 inclines with respect to an imaginary vertical line V perpendicular to the second optical axis N2 in the plane YZ. In the present example, an inclination angle θ1 by which the pupil 45 inclines with respect to the imaginary vertical line V is greater than or equal to 90°. The inclination angle θ1 is the angle measured clockwise from the imaginary vertical line V in the plane of view of FIG. 6.

Lens Data

Data on the lenses of the projection system 3B are listed below.

| Surface number | Name | r | d | nd | vd | Mode | Y |
|---|---|---|---|---|---|---|---|
| Object plane | S | 0 | 0 | | | Refraction | |
| 1 | | 0 | 340 | | | Refraction | 1914.065 |
| *2 | 37 | 75 | 40 | 1.509398 | 56.47 | Refraction | 38.86 |
| *3 | 36 | −20.00149 | −40 | 1.509398 | 56.47 | Reflection | 19.584 |
| *4 | 35 | 75 | −4.355193 | | | Refraction | 24.892 |
| *5 | L14 | 77.60267 | −6 | 1.531131 | 55.75 | Refraction | 27.471 |
| *6 | | −42.58011 | −8.718933 | | | Refraction | 27.253 |
| *7 | L13 | −2282.24542 | −6 | 1.531131 | 55.75 | Refraction | 27.791 |
| *8 | | 142.61392 | −2.690961 | | | Refraction | 27.461 |
| 9 | L12 | 400.34409 | −12.633243 | 2.0010 | 29.13 | Refraction | 24.443 |
| 10 | L11 | −25.33642 | −19.732376 | 1.68893 | 31.16 | Refraction | 20.219 |
| 11 | | 47.76234 | −17.5 | | | Refraction | 20 |
| 12 | | 0 | 17.5 | | | Reflection | 20.353 |
| 13 | L10 | 41.78054 | 2 | 2.0508 | 26.942 | Refraction | 11.106 |
| 14 | L09 | 13.4269 | 6.796725 | 1.756515 | 20.6 | Refraction | 9.895 |
| 15 | | −85.85288 | 1.160255 | | | Refraction | 9.646 |
| 16 | L08 | −57.48094 | 2.165522 | 2.0508 | 26.942 | Refraction | 9.329 |
| 17 | | 205.71933 | 4.39874 | | | Refraction | 9.12 |
| Aperture plane | O | 0 | 6.5 | | | Refraction | 8.8 |
| 19 | L07 | 34.48706 | 7.749114 | 1.5148297 | 0.65 | Refraction | 12.125 |
| 20 | | −27.69735 | 0.2 | | | Refraction | 12.42 |
| 21 | L06 | −92.83635 | 3.205603 | 1.848845 | 18.45 | Refraction | 12.221 |
| 22 | | −27.47355 | 0.642366 | | | Refraction | 12.239 |
| 23 | L05 | −24.284 | 13.1085 | 2.0508 | 26.942 | Refraction | 12.089 |
| 24 | L04 | 45.64385 | 10 | 1.625709 | 56.26 | Refraction | 14.009 |
| 25 | | −43.78258 | 2.109582 | | | Refraction | 15.164 |
| 26 | L03 | 168.81856 | 1 | 2.0482 | 26.295 | Refraction | 15.953 |
| 27 | L02 | 31.82692 | 8.782057 | 1.64735 | 54.54 | Refraction | 16.04 |
| 28 | | −59.95697 | 0.1 | | | Refraction | 16.425 |
| 29 | L01 | 63.93968 | 5.499392 | 1.737812 | 32.8 | Refraction | 16.951 |
| 30 | | −124.42727 | 5 | | | Refraction | 17 |
| 31 | 19 | 0 | 35.95 | 1.51633 | 64.14 | Refraction | 15.933 |
| 32 | | 0 | 8.5 | | | Refraction | 12.822 |
| Image plane | 18 | 0 | 0 | | | Refraction | 1914.065 |

The eccentricity type of the surface number 12 of the deflector 33 is a decenter and bend type. Eccentricity data is $\beta=45$. The aspheric constants of each of the aspheric surfaces are listed below.

| Surface number | 2 |
|---|---|
| Conic constant | 2.443794E+00 |
| Fourth-order coefficient | 1.014527E−06 |
| Sixth-order coefficient | 1.278991E−09 |
| Eighth-order coefficient | −1.284281E−12 |
| Tenth-order coefficient | 5.096298E−16 |

| Surface number | 3 |
|---|---|
| Conic constant | −4.211238E+00 |
| Fourth-order coefficient | −2.156765E−05 |
| Sixth-order coefficient | 6.53232E−08 |
| Eighth-order coefficient | −1.06105E−10 |
| Tenth-order coefficient | 9.251319E−14 |

| Surface number | 4 |
|---|---|
| Conic constant | 2.443794E+00 |
| Fourth-order coefficient | 1.014527E−06 |
| Sixth-order coefficient | 1.278991E−09 |
| Eighth-order coefficient | −1.284281E−12 |
| Tenth-order coefficient | 5.096298E−16 |

-continued

| Surface number | 5 |
|---|---|
| Conic constant | 6.289168E+00 |
| Fourth-order coefficient | −2.725426E−05 |
| Sixth-order coefficient | 1.108287E−08 |
| Eighth-order coefficient | −5.395725E−12 |

| Surface number | 6 |
|---|---|
| Conic constant | −2.015614E+01 |
| Fourth-order coefficient | 1.777707E−05 |
| Sixth-order coefficient | −1.92065E−08 |
| Eighth-order coefficient | 1.517275E−12 |

| Surface number | 7 |
|---|---|
| Conic constant | 1E+02 |
| Fourth-order coefficient | −1.276331E−05 |
| Sixth-order coefficient | 6.080284E−08 |
| Eighth-order coefficient | −5.525861E−11 |

| Surface number | 8 |
|---|---|
| Conic constant | 1.150079E+01 |
| Fourth-order coefficient | −1.281038E−05 |
| Sixth-order coefficient | 5.200682E−08 |
| Eighth-order coefficient | −4.104586E−11 |

The first length R1, which is the overall length of the first section 35, is longer than the second length R2, which is the overall length of the second section 36, as indicated by the lens data. That is, the first length R1, which is the length from the liquid crystal panels 18, which are located in the reduction-side image formation plane, to the enlargement-side lens surface of the lens L10, is longer than the second length R2, which is the length from the reduction-side surface of the lens L11 to the enlargement-side surface of the lens L14. In other words, the second length R2, which is the overall length of the second section 36, is shorter than the first length R1, which is the overall length of the first section 35. In the present example, the first length R1 is 124.868 mm, and the second length R2 is 55.7755 mm.

In the fourth jointed lens L24, the refractive index of the lens L11, which is a positive lens, is smaller than the refractive index of the lens L12, which is a negative lens. An example of the combination of the lenses that form the jointed lens may be C7 and F2 manufactured by HOYA Corporation. The relationship between the partial dispersion ratio Pgf and the Abbe number vd of C7 and those of F2 provides a straight line, and the gradient of the straight line is K_C7F2=| (Pgf_C7−Pgf_F2)/(vd_C7−vd_F2)|=0.0018. To reduce the chromatic aberrations based on the combination of the two glass materials, a combination that allows a small gradient may be selected. In the present example, the glass material of L11 is EFD8 manufactured by HOYA Corporation, and the glass material of L12 is TAFD55 manufactured by HOYA Corporation. Therefore, the partial dispersion ratio of L11 Pgf_L11 is 0.599, the Abbe number vd_L11 is 31.161, the partial dispersion ratio of L12 Pgf_L12 is 0.5995, and the Abbe number vd_L12 is 29.134. Therefore, when |(Pgf_L11−Pgf_L12)/(vd_L11−vd_L12| is defined as K_L11L12, K=0.00025, and the following conditional expression is satisfied:

K_L11L12<K_C7F2

That is, K_C7F2=0.0018.

Further, K_L11l12=0.00025.

Effects and Advantages

The projection system 3B according to the present example provides the same effects and advantages as those provided by the projection system 3A described above.

In the projection system. 3B according to the present example, the optical element 40 of the second optical system has the first transmissive surface 41, the reflection surface 42, and the second transmissive surface 43 sequentially arranged from the reduction side toward the enlargement side. Therefore, in the projection system 3B, the second transmissive surface 43 can refract the light flux reflected off the reflection surface 42 in the second optical system 32. The projection distance of the projection system 3B can therefore be readily shortened as compared with a case where the second optical system 32 has only the reflection surface 42. In other words, the projection system 3B according to the present example can have a short focal length as compared with the case where the second optical system 32 has only the reflection surface, as in the projection system 3A described above.

The second transmissive surface 43 of the optical element 40 has the second transmissive surface 43 having a convex shape protruding toward the enlargement side and can therefore refract the light flux. The thus functioning second transmissive surface 43 can suppress inclination of the intermediate image 39, which is conjugate with the screen S, which is the enlargement-side image formation plane, with respect to the second optical axis N2 and the resultant increase in the size of the intermediate image 39. An increase in the size of the reflection surface 42, which is located at the enlargement side of the intermediate image 39, can therefore be suppressed. That is, the size of the reflection surface 42 can be reduced, as compared with that in the projection system 3A described above.

In the present example, the intermediate image 39 is located between the first transmissive surface 41 and the reflection surface 42 of the optical element 40. The first optical system 31 and the optical element 40 are therefore allowed to approach each other as compared with a case where the intermediate image 39 is formed between the first optical system 31 and the optical element 40. The projector 1 can thus be compact in the axis-Z direction.

Further, in the optical element 40, the first transmissive surface 41, the reflection surface 42, and the second transmissive surface 43 each have a rotationally symmetric shape around the second optical axis N2. The optical element 40 is therefore readily manufactured as compared with a case where the surfaces are not rotationally symmetric.

The pupil 45 of the second optical system 32 inclines with respect to the imaginary vertical line V perpendicular to the second optical axis N2. Therefore, in the projection system 3B, a decrease in the amount of light at a periphery of the screen S that is the periphery at the upper side Y1 can therefore be suppressed as compared with a case where the pupil 45 is parallel to the imaginary vertical line V. That is, in the configuration in which the pupil 45 inclines with respect to the imaginary vertical line V perpendicular to the second optical axis N2, the amount of light flux that reaches the upper portion of the screen S increases as compared with the case where the pupil 45 is parallel to the imaginary vertical line V. Further, when the amount of light flux that reaches the upper portion of the screen S increases, the difference in the amount of light between the light flux that reaches the upper portion of the screen S and the light flux that reaches the lower portion of the screen S decreases. A decrease in the amount of light at the upper periphery of the screen S as compared with that at the lower periphery of the screen S can therefore be suppressed.

Further, in the optical element 40 in the present example, the first transmissive surface 41, which is located at the reduction side of the intermediate image 39, is an aspheric surface, whereby occurrence of aberrations at the intermediate image 39 can be suppressed. Moreover, the reflection surface 42 and the second transmissive surface 43 of the optical element 40 are also each an aspheric surface. Occurrence of aberrations can therefore be suppressed in the enlargement-side image formation plane.

Also in the projection system 3B according to the present example, the lenses L14 and L13 may be movable in the axis-Z direction. Focusing can therefore be performed when the projection distance is changed from the prespecified reference distance J1 to the short distance J2 or the long distance J3. In this case, focusing can also be performed when only the lens L14 is movable in the axis-Z direction. Similarly, focusing can also be performed when only the lens L13 is movable in the axis-Z direction.

The projection system 3B can include a third optical system including an optical member, such as a lens and a mirror, at the enlargement side of the second optical system 32.

What is claimed is:

1. A projection system comprising:
   a first optical system including a plurality of lenses and a deflector; and
   a second optical system including an optical element having a concave reflection surface and disposed at an enlargement side of the first optical system, wherein the deflector is disposed in one air gap of a plurality of air gaps provided between the lenses adjacent to each other in the first optical system, the air gap having a largest axial inter-surface distance in the first optical system, the first optical system includes a first section located at a reduction side of the deflector and a second section located at the enlargement side of the deflector, a first optical axis section that is an optical axis of the first section and a second optical axis section that is an optical axis of the second section intersect each other, the second section includes three or more lenses containing a first lens and a second lens that each have aspheric surfaces at opposite sides, the second section is shorter than the first section, the first lens is disposed at the enlargement side of the second lens, and at least one of the first lens and the second lens is configured to move in a direction along the second optical axis section.

2. The projection system according to claim 1, wherein the reflection surface is an aspheric surface.

3. The projection system according to claim 1, wherein the optical element is a reflection mirror.

4. The projection system according to claim 1, wherein the optical element has a first transmissive surface, a reflection surface disposed at the enlargement side of the first transmissive surface, and a second transmissive surface disposed at the enlargement side of the reflection surface.

5. The projection system according to claim 4, wherein the second transmissive surface has a convex shape protruding toward the enlargement side.

6. The projection system according to claim 4, wherein the first transmissive surface has a convex shape protruding toward the reduction side.

7. The projection system according to claim 4, wherein at least one of the first transmissive surface and the second transmissive surface is an aspheric surface.

8. The projection system according to claim 4, wherein the first transmissive surface and the reflection surface are disposed at one side of an optical axis of the reflection surface, and the second transmissive surface is disposed at other side of the optical axis of the reflection surface.

9. The projection system according to claim 8, wherein the first transmissive surface, the reflection surface, and the second transmissive surface each have a rotationally symmetric shape around the optical axis of the reflection surface.

10. The projection system according to claim 4, wherein axes X, Y, and Z are three axes perpendicular to one another, an axis-X direction being a width direction of an enlargement-side image formation plane, an axis-Y direction being an upward/downward direction of the enlargement-side image formation plane, and an axis-Z direction being a direction perpendicular to the enlargement-side image formation plane, a pupil that connects an upper intersection to a lower intersection inclines with respect to an imaginary vertical line that is perpendicular to an optical axis of the reflection surface in a plane YZ containing the optical axis and the axis-Y direction, the upper intersection is an intersection where an upper peripheral light ray of an upper end light flux passing through an upper end of an effective light ray range of the second transmissive surface that is an upper end in the axis-Y direction and an upper peripheral light ray of a lower end light flux passing through a lower end of the effective light ray range that is a lower end in the axis-Y direction intersect each other in the plane YZ, and the lower intersection is an intersection where a lower peripheral light ray of the upper end light flux and a lower peripheral light ray of the lower end light flux intersect each other in the plane YZ.

11. The projection system according to claim 4, wherein an intermediate image is formed at the reduction side of the reflection surface.

12. The projection system according to claim 1, wherein an angle between the first optical axis section and the second optical axis section is smaller than or equal to 90°.

13. The projection system according to claim 1, wherein the first lens and the second lens are both configured to move in the direction along the first optical axis section, and a movement distance over which the first lens is moved is shorter than a movement distance over which the second lens is moved.

14. The projection system according to claim 1, wherein the first lens is made of resin.

15. The projection system according to claim 1, wherein the second lens is made of resin.

16. The projection system according to claim 1, wherein the second section includes a jointed lens.

17. The projection system according to claim 16, wherein the jointed lens includes a positive lens and a negative lens, and a refractive index of the positive lens is smaller than a refractive index of the negative lens.

18. The projection system according to claim 17, wherein a conditional expression below is satisfied:

$$|\Delta Pgf/\Delta vd|<0.0018,$$

where $\Delta Pgf$ is a difference in a partial dispersion ratio between the positive lens and the negative lens, and $\Delta vd$ is a difference in an Abbe number at a d line between the positive lens and the negative lens.

19. A projector comprising:

the projection system according to claim 1; and an image formation section that forms a projection image in a reduction-side image formation plane of the projection system.

20. A projection system comprising:

a first optical system including a plurality of lenses and a deflector; and a second optical system including an optical element having a concave reflection surface and disposed at an enlargement side of the first optical system, wherein the deflector is disposed in one air gap of a plurality of air gaps provided between the lenses adjacent to each other in the first optical system, the air gap having a largest axial inter-surface distance in the first optical system, the first optical system includes a first section located at a reduction side of the deflector and a second section located at the enlargement side of the deflector, a first optical axis section that is an optical axis of the first section and a second optical axis section that is an optical axis of the second section intersect each other, the second section includes three or more lenses, the second section is shorter than the first section, the optical element has a first transmissive surface, a reflection surface disposed at the enlargement side of the first transmissive surface, and a second transmissive surface disposed at the enlargement side of the reflection surface, axes X, Y, and Z are three axes perpendicular to one another, an axis-X direction being a width direction of an enlargement-side image formation plane, an axis-Y direction being an upward/downward direction of the enlargement-side image formation plane, and an axis-Z direction being a direction perpendicular to the enlargement-side image formation plane, a pupil that connects an upper intersection to a lower intersection inclines with respect to an imaginary vertical line that is perpendicular to an optical axis of the reflection surface in a plane YZ containing the optical axis and the axis-Y direction, the upper intersection is an intersection where an upper peripheral light ray of an upper end light flux passing through an upper end of an effective light ray range of the second transmissive surface that is an upper end in the axis-Y direction and an upper peripheral light ray of a lower end light flux passing through a lower end of the effective light ray range that is a lower end in the axis-Y direction intersect each other in the plane YZ, and the lower intersection is an intersection where a lower peripheral light ray of the upper end light flux and a lower peripheral light ray of the lower end light flux intersect each other in the plane YZ.

21. A projector comprising:
the projection system according to claim 20; and
an image formation section that forms a projection image in a reduction-side image formation plane of the projection system.

22. A projection system comprising:
a first optical system including a plurality of lenses and a deflector; and
a second optical system including an optical element having a concave reflection surface and disposed at an enlargement side of the first optical system, wherein
the deflector is disposed in one air gap of a plurality of air gaps provided between the lenses adjacent to each other in the first optical system, the air gap having a largest axial inter-surface distance in the first optical system,
the first optical system includes a first section located at a reduction side of the deflector and a second section located at the enlargement side of the deflector,
a first optical axis section that is an optical axis of the first section and a second optical axis section that is an optical axis of the second section intersect each other,
the second section includes three or more lenses containing a jointed lens,
the second section is shorter than the first section,
the jointed lens includes a positive lens and a negative lens,
a refractive index of the positive lens is smaller than a refractive index of the negative lens, and
a conditional expression below is satisfied:
$$|\Delta Pgf/\Delta vd| < 0.0018,$$
where $\Delta Pgf$ is a difference in a partial dispersion ratio between the positive lens and the negative lens, and $\Delta vd$ is a difference in an Abbe number at a d line between the positive lens and the negative lens.

23. A projector comprising:
the projection system according to claim 22; and
an image formation section that forms a projection image in a reduction-side image formation plane of the projection system.

24. A projection system comprising:
a first optical system including a plurality of lenses and a deflector; and
a second optical system including an optical element having a concave reflection surface and disposed at an enlargement side of the first optical system, wherein
the deflector is disposed in one air gap of a plurality of air gaps provided between the lenses adjacent to each other in the first optical system, the air gap having a largest axial inter-surface distance in the first optical system,
the first optical system includes a first section located at a reduction side of the deflector and a second section located at the enlargement side of the deflector,
a first optical axis section that is an optical axis of the first section and a second optical axis section that is an optical axis of the second section intersect each other,
the second section includes three or more lenses,
the second section is shorter than the first section, and
the optical element has a first transmissive surface, a reflection surface disposed at the enlargement side of the first transmissive surface, and a second transmissive surface disposed at the enlargement side of the reflection surface.

25. The projection system according to claim 24,
wherein the second transmissive surface has a convex shape protruding toward the enlargement side, and
the first transmissive surface has a convex shape protruding toward the reduction side.

26. The projection system according to claim 24,
wherein at least one of the first transmissive surface and the second transmissive surface is an aspheric surface.

27. The projection system according to claim 24,
wherein the first transmissive surface and the reflection surface are disposed at one side of an optical axis of the reflection surface, and
the second transmissive surface is disposed at other side of the optical axis of the reflection surface.

28. A projector comprising:
the projection system according to claim 24; and
an image formation section that forms a projection image in a reduction-side image formation plane of the projection system.

* * * * *